US010427710B2

(12) United States Patent
Takase et al.

(10) Patent No.: US 10,427,710 B2
(45) Date of Patent: Oct. 1, 2019

(54) ELECTRIC POWER STEERING APPARATUS

(71) Applicant: NSK Ltd., Tokyo (JP)

(72) Inventors: Hiroaki Takase, Tokyo (JP); Ryo Minaki, Tokyo (JP); Hideki Sawada, Tokyo (JP); Takayoshi Sugawara, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/320,664

(22) PCT Filed: Aug. 16, 2017

(86) PCT No.: PCT/JP2017/029444
§ 371 (c)(1),
(2) Date: Jan. 25, 2019

(87) PCT Pub. No.: WO2018/037980
PCT Pub. Date: Mar. 1, 2018

(65) Prior Publication Data
US 2019/0168801 A1 Jun. 6, 2019

(30) Foreign Application Priority Data
Aug. 24, 2016 (JP) .................................. 2016-163714

(51) Int. Cl.
*B62D 5/04* (2006.01)
*B62D 6/00* (2006.01)
(Continued)

(52) U.S. Cl.
CPC ............ *B62D 5/0463* (2013.01); *B62D 6/00* (2013.01); *H02M 1/38* (2013.01); *H02M 7/5395* (2013.01);
(Continued)

(58) Field of Classification Search
None
See application file for complete search history.

(56) References Cited

U.S. PATENT DOCUMENTS 7,659,679 B2 * 2/2010 Raja ........................ B62D 5/046
318/484
8,907,602 B2 * 12/2014 Mukai ..................... H02P 21/05
318/400.02
(Continued)

FOREIGN PATENT DOCUMENTS

JP 4681453 B2 5/2011
JP 2014-212612 A 11/2014
(Continued)

OTHER PUBLICATIONS

International Search Report of PCT/JP2017/029444 dated Nov. 21, 2017 [PCT/ISA/210].
(Continued)

*Primary Examiner* — Joseph M Rocca
*Assistant Examiner* — Harold Eric Pahlck, III
(74) *Attorney, Agent, or Firm* — Sughrue Mion, PLLC

(57) ABSTRACT

An electric power steering apparatus of vector control system that calculates steering assist command values of dq axes based on at least a steering torque, calculates dq-axes current command values from the steering assist command values, converts the dq-axes current command values into 3-phase duty command values, driving-controls a 3-phase brushless motor by an inverter of a PWM control, and applies an assist torque to a steering system of a vehicle, wherein the electric power steering apparatus has plural dead time compensating functions of which efficiencies to respectively perform a dead time compensation of the inverter are different each other, and performs the dead time compensation by gradually shifting from one of the plural
(Continued)

dead time compensating functions to an another dead time compensating function while mixing the plural dead time compensating functions.

12 Claims, 21 Drawing Sheets

(51) Int. Cl.
    *H02P 21/06*     (2016.01)
    *H02M 7/5395*     (2006.01)
    *H02M 1/38*     (2007.01)
    *H02P 27/08*     (2006.01)

(52) U.S. Cl.
    CPC .............. *H02P 21/06* (2013.01); *H02P 27/08* (2013.01); *H02M 2001/385* (2013.01)

(56) References Cited

U.S. PATENT DOCUMENTS

| | | | |
|---|---|---|---|
| 9,050,996 B2 * | 6/2015 | Kitazume | B62D 5/0463 |
| 9,520,817 B2 * | 12/2016 | Suzuki | B62D 5/0463 |
| 9,985,569 B2 * | 5/2018 | Suzuki | H02P 29/50 |
| 10,097,129 B2 * | 10/2018 | Koseki | H02P 27/06 |
| 2011/0221382 A1 * | 9/2011 | Hayashi | B62D 5/046 318/801 |
| 2018/0294755 A1 * | 10/2018 | Mori | H02P 21/18 |

FOREIGN PATENT DOCUMENTS

| | | |
|---|---|---|
| JP | 2015-171251 A | 9/2015 |
| JP | 2016-055825 A | 4/2016 |
| WO | 2016/125774 A1 | 8/2016 |

OTHER PUBLICATIONS

International Preliminary Report on Patentability of PCT/JP2017/029444 dated Aug. 28, 2018 [PCT/IPEA/409].

* cited by examiner

PRIOR ART

PRIOR ART

PRIOR ART

ELECTRIC POWER STEERING APPARATUS

CROSS REFERENCE TO RELATED APPLICATIONS

This application is a National Stage of International Application No. PCT/JP2017/029444, filed Aug. 16, 2017, claiming priority based on Japanese Patent Application No. 2016-163714, filed Aug. 24, 2016.

TECHNICAL FIELD

The present invention relates to an electric power steering apparatus that vector-controls a driving of a 3-phase brushless motor with a dq-axes rotational coordinate system, improves a steering performance and enables to assist-control with a smooth maneuver and without a steering sound, by performing a dead time compensation corresponding to a steering state by gradually switching plural dead time compensating functions (e.g. a dead time compensating function of an inverter based on motor terminal voltages and a dead time compensating function of the inverter based on a function of a motor rotational angel (an electric angle)) while mixing them.

BACKGROUND ART

An electric power steering apparatus (EPS) which provides a steering system of a vehicle with a steering assist torque (an assist torque) by a rotational torque of a motor, applies the steering assist torque to a steering shaft or a rack shaft by means of a transmission mechanism such as gears by using a driving force of the motor which is controlled by electric power supplied from an electric power supplying section. In order to accurately generate the steering assist torque, such a conventional electric power steering apparatus performs a feed-back control of a motor current. The feed-back control adjusts a voltage supplied to the motor so that a difference between a steering assist command value (a current command value) and a detected motor current value becomes small, and the adjustment of the voltage supplied to the motor is generally performed by an adjustment of duty command values of a pulse width modulation (PWM) control.

A general configuration of the conventional electric power steering apparatus will be described with reference to FIG. 1. As shown in FIG. 1, a column shaft (a steering shaft or a handle shaft) 2 connected to a handle (a steering wheel) 1 is connected to steered wheels 8L and 8R through reduction gears 3, universal joints 4a and 4b, a pinion-and-rack mechanism 5, and tie rods 6a and 6b, further via hub units 7a and 7b. In addition, the steering shaft 2 is provided with a steering angle sensor 14 for detecting a steering angle θ and a torque sensor 10 for detecting a steering torque Th of the handle 1, and a motor 20 for assisting the steering torque of the handle 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command (a steering assist command) on the basis of the steering torque Th detected by the torque sensor 10 and a vehicle speed Vs detected by a vehicle speed sensor 12, and controls a current supplied to the motor 20 by means of a voltage control command value Vref obtained by performing a compensation or the like to the current command value.

As well, a steering angle sensor 14 is not indispensable and may not be provided. It is possible to obtain the steering angle θ from a rotational position sensor which is connected to the motor 20.

A controller area network (CAN) 40 to send/receive various information and signals on the vehicle is connected to the control unit 100, and it is also possible to receive the vehicle speed Vel from the CAN 40. Further, a Non-CAN 41 is also possible to connect to the control unit 30, and the Non-CAN 41 sends and receives a communication, analogue/digital signals, electric wave or the like except for the CAN 40.

The control unit 30 mainly comprises a CPU (Central Processing Unit) (including an MPU (Micro Processor Unit) and an MCU (Micro Controller Unit)), and general functions performed by programs within the CPU are, for example, shown in FIG. 2.

The control unit 30 will be described with reference to FIG. 2. As shown in FIG. 2, the steering torque Th detected by the torque sensor 10 and the vehicle speed Vs detected by the vehicle speed sensor 12 are inputted into a steering-assist command value calculating section 31, and the steering-assist command value calculating section 31 calculates a steering assist command value Iref1 based on the steering torque Th and the vehicle speed Vs with reference to an assist map or the like. The calculated steering assist command value Iref1 is added with a compensation signal CM for improving characteristics from a compensating section 34 at an adding section 32A. The steering assist command value Iref2 after addition is limited the maximum value thereof at a current limiting section 33. The current command value Irefm whose maximum current is limited is inputted into a subtracting section 32B, and the current command value Irefm is subtracted a motor current detected value Im at the subtracting section 32B.

A deviation ΔI (=Irefm−Im) which is a subtracted result at the subtracting section 32B is current-controlled with a proportional-integral (PI) and so on at a PI-control section 35, the current-controlled voltage control command value Vref is inputted into a PWM-control section 36 with a modulation signal (a triangular wave carrier) CF. Duty command values are calculated at the PI-control section 35, and the motor 20 is PWM-controlled by using a PWM signal being calculated duty command values via an inverter 37. The motor current value Im of the motor 20 is detected by a motor current detector 38 and is fed-back to the subtracting section 32B.

The compensating section 34 adds a detected or estimated self-aligning torque (SAT) 343 with an inertia compensation value 342 at an adding section 344, further adds a convergence control value 341 with the added value at an adding section 345, and performs a characteristic improvement by inputting the added result to the adding section 32A as the compensation signal CM.

Recently, a 3-phase brushless motor is mainly used as an actuator of the electric power steering apparatus, and since the electric power steering apparatus is automotive products, the operating temperature range is wide. From a view point of a fail-safe, a dead time of the inverter to drive the motor needs greater than that for general industrial purposes that home appliances ("industrial equipment"<"EPS"). Generally, since a switching device (e.g. a field-effect transistor (FET)) has a delay time when it is turned OFF, a direct current (DC) link is shorted when the switching devices of an upper-arm and a lower-arm are simultaneously turned ON or OFF. In order to prevent the above problem, a time (a dead time) that the switching devices of both arms are turned OFF, is set.

As a result, a current waveform is distorted, and a responsibility of the current control and a steering feeling go down. For example, in a state that the handle is near on-center of the steering, a discontinuous steering feeling and the like due to the torque ripple are occurred. Further, since a motor back-EMF (electromotive force) at a time of a middle speed steering or a high speed steering and an interference voltage among windings act for the current control as a disturbance, a steering follow-up performance and a steering feeling at a turning back maneuver go down.

A q-axis to control the torque being the coordinate axis of a rotor of the 3-phase brushless motor and a d-axis to control the magnetic field strength are independently set and has a relation that the d-axis and the q-axis is 90°. Thus, a vector control system to control the currents (the d-axis current command value and the q-axis current command value) corresponding to respective axes with the vector, is known.

FIG. 3 shows a configuration example in a case that a 3-phase brushless motor 100 is driving-controlled by the vector control system. Steering assist command values (Iref2 (idref, iqref$_f$)) of two axes based on the steering torque Th, the vehicle speed Vs and so on are calculated, a d-axis current command value id* and a q-axis current command value iq* whose maximum values are limited are respectively inputted into subtracting sections 131$d$ and 131$q$, and current deviations Δid* and Δiq* obtained at the subtracting sections 131$d$ and 131$q$ are respectively inputted into PI-control sections 120$d$ and 120$q$. Voltage command values vd and vq PI-controlled at the PI-control sections 120$d$ and 120$q$ are respectively inputted into a subtracting section 141$d$ and an adding section 141$q$, and voltages Δvd and Δvq obtained at the subtracting section 141$d$ and the adding section 141$q$ are inputted into a dq-axes/3-phase alternative current (AC) converting section 150. Voltage command values Vu*, Vv*, Vw* converted into 3-phases at the dq-axes/3-phase AC converting section 150 are inputted into a PWM-control section 160, and the motor 100 is driven with PWM-signals $U_{PWN}$, $V_{PWN}$, $W_{PWM}$ based on calculated 3-phase duty command values (Duty$_u$, Duty$_v$, Duty$_w$) via the inverter (inverter-applying voltage VR) 161 comprised of abridge constitution of an upper-arm and a lower-arm as shown in FIG. 4. The upper-arm comprises of FETs Q1, Q3, Q5 serving as switching devices and the lower-arm comprises of FETs Q2, Q4, Q6.

The 3-phase motor currents iu, id, iw of the motor 100 are detected by current detectors 162, and the detected 3-phase motor currents iu, id, iw are inputted into a 3-phase AC/dq-axes converting section 130. Feed-back currents id and iq of 2-phases converted at the 3-phase AC/dq-axes converting section 130 are respectively inputted into subtracting sections 131$d$ and 131$q$, and further inputted into a d-q non-interference control section 140. Further, a rotational sensor or the like is attached to the motor 100, and a motor rotational angle θ and a motor rotational number (a rotational velocity) ω are outputted from an angle detecting section 110 to process the sensor signal. The motor rotational angle θ is inputted into the dq-axes/3-phase AC converting section 150 and the 3-phase AC/dq-axes converting section 130, and the motor rotational number ω is inputted into the d-q non-interference control section 140. Voltage vd1* and vq1* of 2-phases from the d-q non-interference control section 140 are respectively inputted into the subtracting section 141$d$ and the adding section 141$q$, and the voltages Δvd and Δvq are calculated at the subtracting section 141$d$ and the adding section 141$q$.

The electric power steering apparatus of the vector control system described above is an apparatus to assist a steering of a driver, and a sound and a vibration of the motor, a torque ripple and the like are also transmitted to the driver as a force sense via the steering wheel. The FETs are generally used as power devices to drive the inverter, and the current is applied to the motor. In a case that the 3-phase motor is used, FETs, which are connected in series for respective phases, of the upper-arm and the lower-arm are used as shown in FIG. 4. Although the FETs of the upper-arm and the lower-arm are alternatively turned ON and OFF, the FET does not simultaneously turn ON and OFF in accordance with a gate signal since the FET is not an ideal switching device. Therefore, a turn-ON time and a turn-OFF time are needed. Consequently, if an ON-command for the upper-arm FET and an OFF-command for the lower-arm FET are simultaneously inputted, there is a problem that the upper-arm FET and the lower-arm FET simultaneously turn ON and the upper-arm and the lower-arm become short circuits. There is a difference between the turn-ON time and the turn-OFF time of the FET. Thus, when the command is inputted into the FETs at the same time, the FET immediately turns ON in a case that the turn-ON time is short (for example, 100 [ns]) by inputting the ON-command to the upper-FET, and reversely, the FET does not immediately turns OFF in a case that the turn-OFF time is long (for example, 400 [ns]) by inputting the OFF-command to the lower-FET. In this way, a state (for example, between 400 [ns]-100 [ns], ON-ON) that the upper-FET is ON and the lower FET is ON, often momentarily occurs.

In this connection, in order not to occur that the upper-arm FET and the lower-arm FET do not simultaneously turn ON, the ON-signal is usually given to the gate driving circuit with a predetermined period being a dead time. Since the dead time is nonlinear, the current waveform is distorted, the responsibility of the control goes down and the sound, the vibration and the torque ripple are generated. In a column type electric power steering apparatus, since an arrangement of the motor directly connected to a gear box which is connected by the steering wheel and the column shaft made of steel is extremely near the driver in the mechanism, it is necessary to especially consider the sound, the vibration, the torque ripple due to the motor in comparison with a downstream type electric power steering apparatus.

Conventionally, as a method to compensate the dead time of the inverter, there are methods to add the compensation value by detecting a timing occurring the dead time and to compensate the dead time by a disturbance observer on the dq-axes in the current control.

The electric power steering apparatus to compensate the dead time is disclosed in, for example, Japanese Patent No. 4681453 B2 (Patent Document 1) and Japanese Published Unexamined Patent Application No. 2015-171251 A (Patent Document 2). In Patent Document 1, there is provided a dead band compensating circuit that generates a model current based on the current command values by inputting the current command values into a reference model circuit of the current control loop including the motor and the inverter, and compensates the influence of the dead time of the inverter based on the model current. Further, in Patent Document 2, there is provided a dead time compensating section to correct based on the dead time compensation value for the duty command value, and the dead time compensating section comprises a basic compensation value calculating section to calculate a basic compensation value being a basic value of the dead time compensation value based on the current command value and a filtering section to perform a filtering-process corresponding to a low pass filter (LPF) for the basic compensation value.

THE LIST OF PRIOR ART DOCUMENTS

Patent Documents

Patent Document 1: Japanese Patent No. 4681453 B2
Patent Document 2: Japanese Published Unexamined Patent Application No. 2015-171251 A

SUMMARY OF THE INVENTION

Problems to be Solved by the Invention

The apparatus disclosed in Patent Document 1 is a system that estimates the compensation sign by using a calculation of the dead time compensation amount due to the q-axis current command value and the 3-phase current reference model. The output value of the compensating circuit is a changing value in proportion to the model current in a region being a predetermined fixed value or less, and is an addition value of the changing values in proportion to the fixed value and the model current in a region being more than the predetermined fixed value. In this way, the output value of the compensating circuit is outputted from the current command to the voltage command. However, the tuning working for determining the hysteresis characteristic to output the predetermined fixed value is necessary.

Further, in the apparatus disclosed in Patent Document 2, when the dead time is determined, the dead time compensation is performed by using the q-axis current command value and the compensation value LPF-processed the q-axis current command value. Thus, the delay occurs, and there is a problem that the dead time compensation value is not operated for the final voltage command to the motor.

Furthermore, there is a case that plural dead time compensating functions are switched in a specific region in order to improve the steering performance. For example, in the high speed steering maneuver, the steering characteristic of the dead time compensation value greatly varies in other than case that the d-axis current command value is "0" [A]. In this connection, in a case that a whole region is compensated by using the dead time compensation of the single function, the compensation accuracy goes down in a specific region and the torque ripple, the sound and the vibration sometime occur.

In the feed-forward type dead time compensation (an angle feed-forward type, a current command value model type), since the current flows in the motor with an exclusive software by locking the motor output shaft, the necessary dead time compensation amount is needed to measure by using the actual machine. It is needed the tuning operation of the threshold value for determining the compensation sign due to the phase adjustment and the current command value by rotating a single motor under a constant load and a constant rotation speed by using a motor test apparatus. It is necessary to allot the inverter-applying voltage and the motor rotational number and to perform plural times, and therefore the mitigation of the tuning operation is required.

Further, in the feed-forward type dead time compensation, the chattering occurs near zero-cross time or at the low load and the low speed steering maneuver in a case that the sign is not switched with an appropriate compensation amount and on an appropriate timing. By inputting the dead time compensation that the compensation amount is unsuitable or the dead time compensation that the timing is unsuitable, there is a case that the chattering is often caused by the control itself. In the feed-forward type dead time compensation, in order to suppress the above chattering, a quite accurate tuning operation such as various ideas and the strict switching of the compensation sign is needed.

The present invention has been developed in view of the above-described circumstances, and an object of the present invention is to provide the electric power steering apparatus that, in the electric power steering apparatus of a vector control system, has plural dead time compensating functions to compensate the dead time of the inverter without the tuning operation, compensates with the feed-forward method by gradually switching the dead time compensating functions corresponding to the steering state while mixing them, improves the steering performance, improves the distortion of the current waveform and the responsibility of the current control, and suppresses the sound, the vibration and the torque ripple.

Means for Solving the Problems

The present invention relates to an electric power steering apparatus of a vector control system that calculates steering assist command values of dq-axes based on at least a steering torque, calculates dq-axes current command values from the steering assist command values, converts the dq-axes current command values into 3-phase duty command values, driving-controls a 3-phase brushless motor by an inverter of a pulse width modulation (PWM) control, and applies an assist torque to a steering system of a vehicle, the above-described object of the present invention is achieved by that: wherein the electric power steering apparatus has plural dead time compensating functions of which efficiencies to respectively perform a dead time compensation of the inverter are different each other, and performs the dead time compensation by gradually shifting from one of the plural dead time compensating functions to an another dead time compensating function while mixing the plural dead time compensating functions.

Further, the present invention relates to an electric power steering apparatus of a vector control system that calculates steering assist command values of dq-axes based on at least a steering torque, calculates dq-axes current command values from the steering assist command values, converts the dq-axes current command values into 3-phase duty command values, driving-controls a 3-phase brushless motor by an inverter of a pulse width modulation (PWM) control, and applies an assist torque to a steering system of a vehicle, the above-described object of the present invention is achieved by that: comprising a dead time compensating section A that calculates first dq-axes compensation values relating to the dq-axes of the inverter based on 3-phase terminal voltages of the 3-phase brushless motor, a dead time compensating section B that calculates second dq-axes compensation values relating to the inverter based on a motor rotational angle, and a compensation-value switching section that gradually and mutually switches while mixing the first dq-axes compensation values and the second dq-axes compensation values based on the steering assist command value of the q-axis, and outputs dq-axes dead time compensation values, wherein a dead time compensation of the inverter is performed by a correction of the dq-axes current command values with the dq-axes dead time compensation values.

Effects of the Invention

The electric power steering apparatus according to the present invention performs the compensation of the dead time in an optimum state corresponding to the steering state by gradually switching plural dead time compensating functions (for example, a dead time compensating function (A) of the inverter based on motor terminal voltages and a dead time compensating function (B) based on a function of a motor rotational angle (electric angle)) with a mixing operation so as to mutually change a ratio of the plural dead time compensating functions, and therefore it is possible to further improve the steering performance. The dead time compensating function (A) of the inverter based on the motor terminal voltages automatically calculates a compensation amount and a compensation sign. Consequently, the dead time compensating function (A) has a feature that it is possible to perform the dead time compensation without a chattering even in a low load and a low speed steering state near the on-center. It is also possible to compensate in a case that the compensation waveform of three phases are not rectangular wave. Further, the dead time compensating function (B) based on the function of the motor rotational angle (electric angle) has a feature that the compensation accuracy is high in the low speed steering region and the middle speed steering region of which phases match in the angle and the phase-current and it is possible to compensate even in a case that the compensation waveform of three phases are not rectangular wave. In the present invention, since the compensating functions A and B are gradually switched in accordance with the steering state while mixing them, it is possible to realize the most suitable steering having the above two features.

MODE FOR CARRYING OUT THE INVENTION

In order to resolve a problem that a current distortion and a torque ripple occur due to an influence of a dead time of an inverter in a control unit (ECU) and a steering sound go down, the present invention performs a dead time compensation of the inverter by gradually switching the dead time compensation values while mixing a dead time compensating function (A) based on motor terminal voltages and a dead time compensating function (B) based on a function corresponding to a motor rotational angle (electric angle) and by applying on dq-axes with a feed-forward.

According to the dead time compensating function due to a single algorithm of a single function, although a compensation accuracy is good in a low speed steering maneuver, it sometime goes down in a high speed steering maneuver. Or, although the compensation accuracy is good in a high load state, it sometime goes down in a low load state. Thus, it is impossible to accurately compensate a whole steering region by the dead time compensation due to the single algorithm of the single function. However, the present invention prepares plural dead time compensating functions which respectively have high compensation accuracies in the steering states, and gradually switches the dead time compensating functions, by mixing, to the optimum compensation function in accordance with the steering state. Consequently, the present invention can perform the dead time compensation with the high accuracy for the whole steering region In the present invention, the dead time compensations based on the plural compensating functions are individually performed for the d-axis voltage command value and the q-axis voltage command value of the dq-axes vector control system, the dead time compensating functions are switched with the steering assist command value of the q-axis, the q-axis current command value and the motor rotational number, the switching (shifting) is performed by changing the ratios of the functions, and then the most suitable dead time compensation value is selected in the whole region of the low speed steering region, the middle speed steering region and the high speed steering region. The embodiments according to the present invention are the constitution that has two dead time compensating functions A and B, and has a configuration that performs a switch judgment of the compensation values with the steering assist command value of the q-axis, calculates a mixing-ratio when a switch judgment flag is outputted, gradually switches by using the calculated mixing-ratio, and shifts the dead time compensation functions.

Figure 24A:
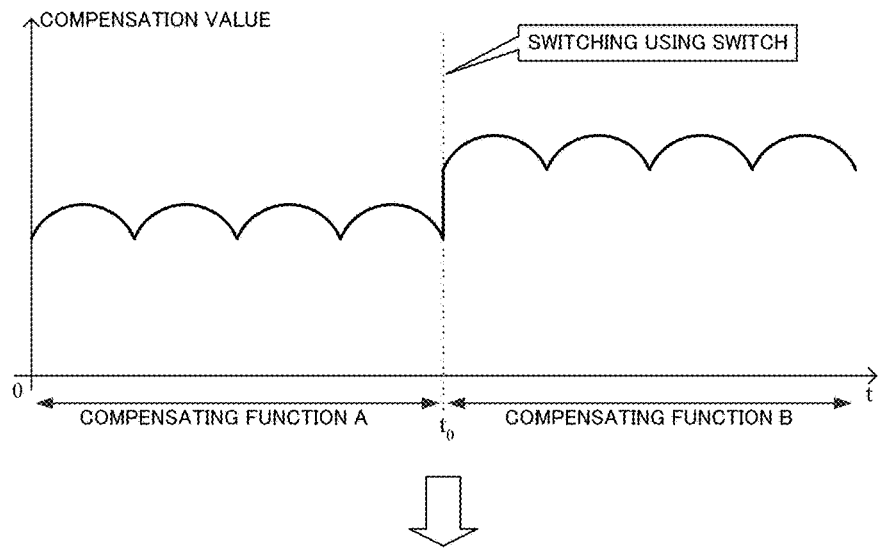
FIGS. 24A and 24B are diagrams explaining an example of a mixing operation.

There are respectively differences for the compensation values and the phases when the dead time compensation values having different characteristics are switched. Thus, in a case of simply switching, a step-like deviation occurs in the compensation values as shown in FIG. 24A and the torque ripple occurs. For example, assuming that the compensation amount of the dead time compensating function B at the switching time is "1.00", the compensation amount of the dead time compensating function A is "0.92" to "0.95" and there is the difference. Especially, in the steering of the low load and low speed region which the current amount to flow in the motor is small, the influence of the dead time compensation amount is great (because the dead time compensation voltage is larger than the command voltage of the PI-control or the like), the torque ripple is occurred even in a small step-like deviation. In this connection, the present invention mixes the two compensation values and then obtains the sweep-like deviation by providing the switching (shifting) term so as to prevent the occurrence of the torque ripple. Further, the driver does not feel the switching operation when the compensation values are changed.

As well, although there are differences due to the type of the motor, a reduction ratio of the reduction gears of the EPS and so on, for example, the motor rotational number of the low speed steering region is "0" to "300" [rpm], the motor rotational number of the middle speed steering region is "300" to "1800" [rpm], and the motor rotational number of the high speed steering region is "1800" to "4000" [rpm] which is equal to or more than a rated rotational number (the rotational number region to need a field-weakening control) of the motor.

Embodiments according to the present invention will be described in detail with reference to the drawings.

Figure 3:
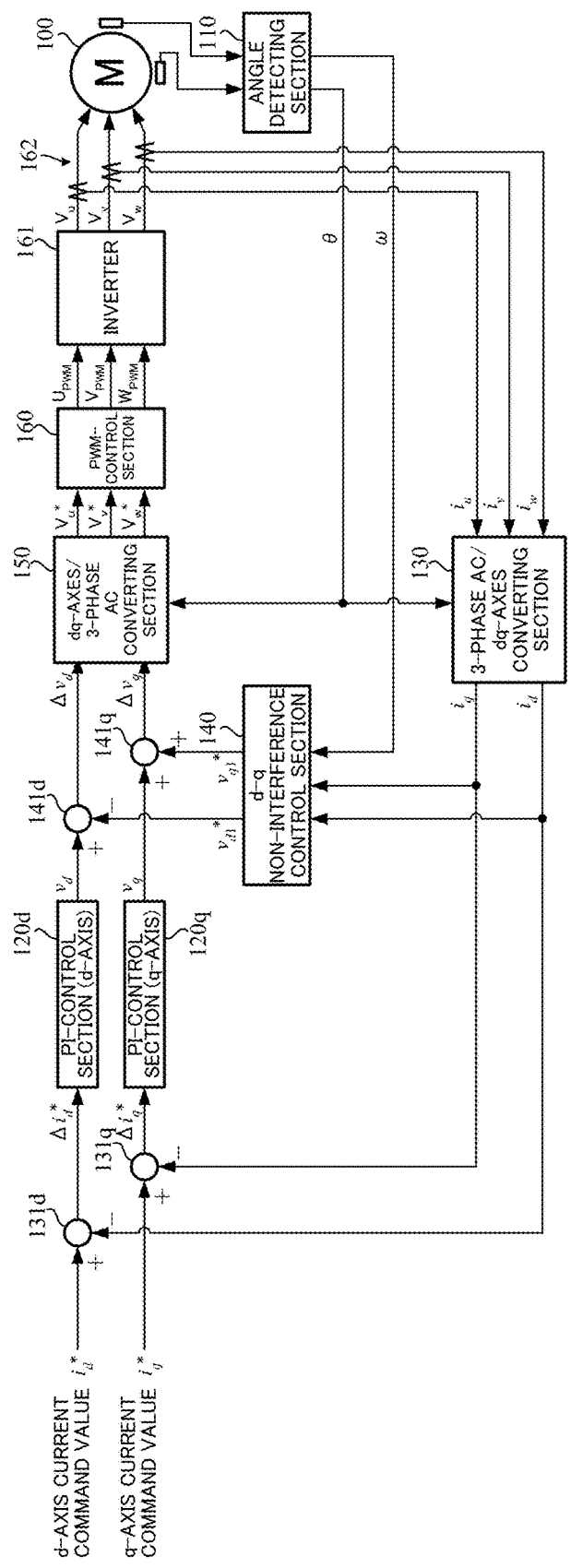
FIG. 3 is a block diagram showing a configuration example of a vector control system.
Figure 4:
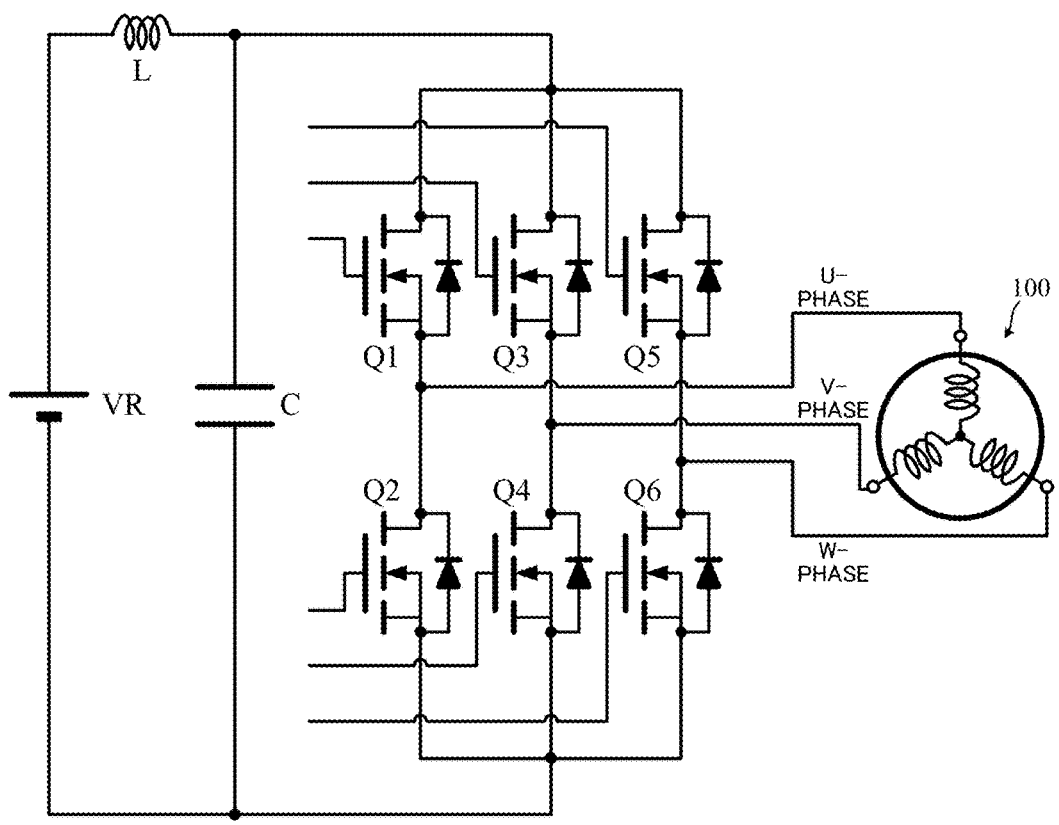
FIG. 4 is a wiring diagram showing a configuration example of a general inverter.
Figure 5:
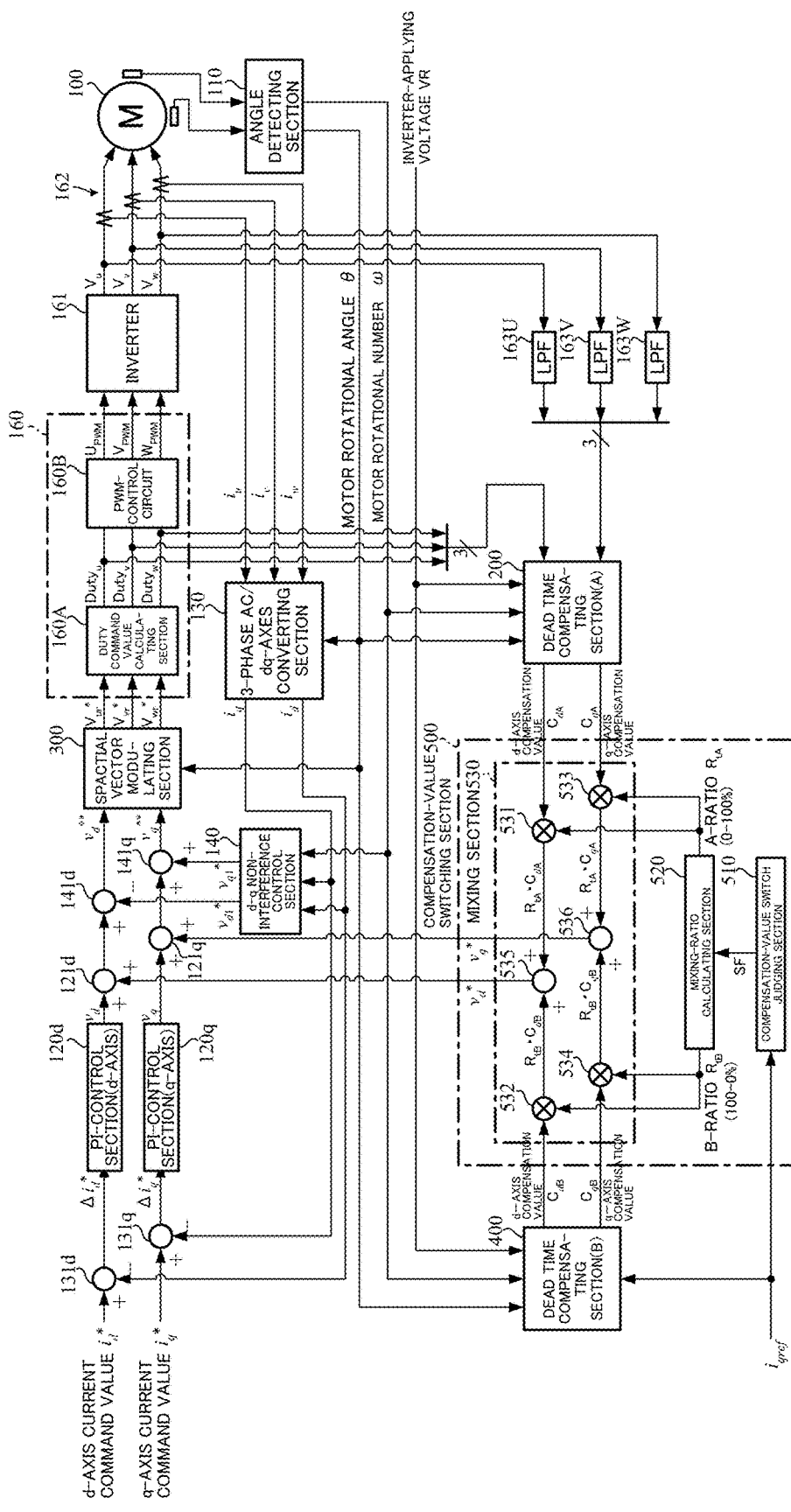
FIG. 5 is a block diagram showing a configuration example of the present invention.

FIG. 5 shows a whole configuration example of the present invention corresponding to FIG. 3, and there are provided a dead time compensating section (A) 200 to calculate compensation values vdA and vqA on the dq-axes, a dead time compensating section (B) 400 to calculate compensation values vdB and vqB on the dq-axes and a compensation-value switching section 500 to output dead time compensation values vd* and vq* by gradually switching the compensation values vdA and vqA and the compensation values vdB and vqB with a mixing operation. The dead time compensating section (B) 400 has a characteristic that the compensation accuracy is high in the low speed steering region and the middle speed steering region, and alternatively the dead time compensating section (A) 200 has a characteristic that the compensation accuracy is high in the low load and the low speed steering region.

For example, the dead time compensating function (A) is a dead time compensating function of a terminal voltage feed-back type and automatically calculates the optimal compensation sign and compensation amount in the low load and the low speed steering state (a steering to slowly swing the steering wheel to right or left near on-center, and so on). Thus, it is possible to perform an accurate compensation. On the other hand, the dead time compensating function (B) is a dead time compensating function of an angle feed-forward type and can enter the ideal dead time compensation values, with a predetermined angle and without a delay, in the middle speed steering state (a steering at a constant speed, a steering with gradual steer-backward, and so on) from the low speed steering which does not need the d-axis current. Thus, it is possible to perform the accurate compensation. Further, since the dead time compensation values corresponding to the angle are calculated, it is possible to stably compensate the dead time, without the influence of the calculation, even in a case that the noise and the small ripple are included in the detected current in the steering load region other than the low load steering region (e.g. the current command value is "0" to "4" [A], and so on).

Figure 1:
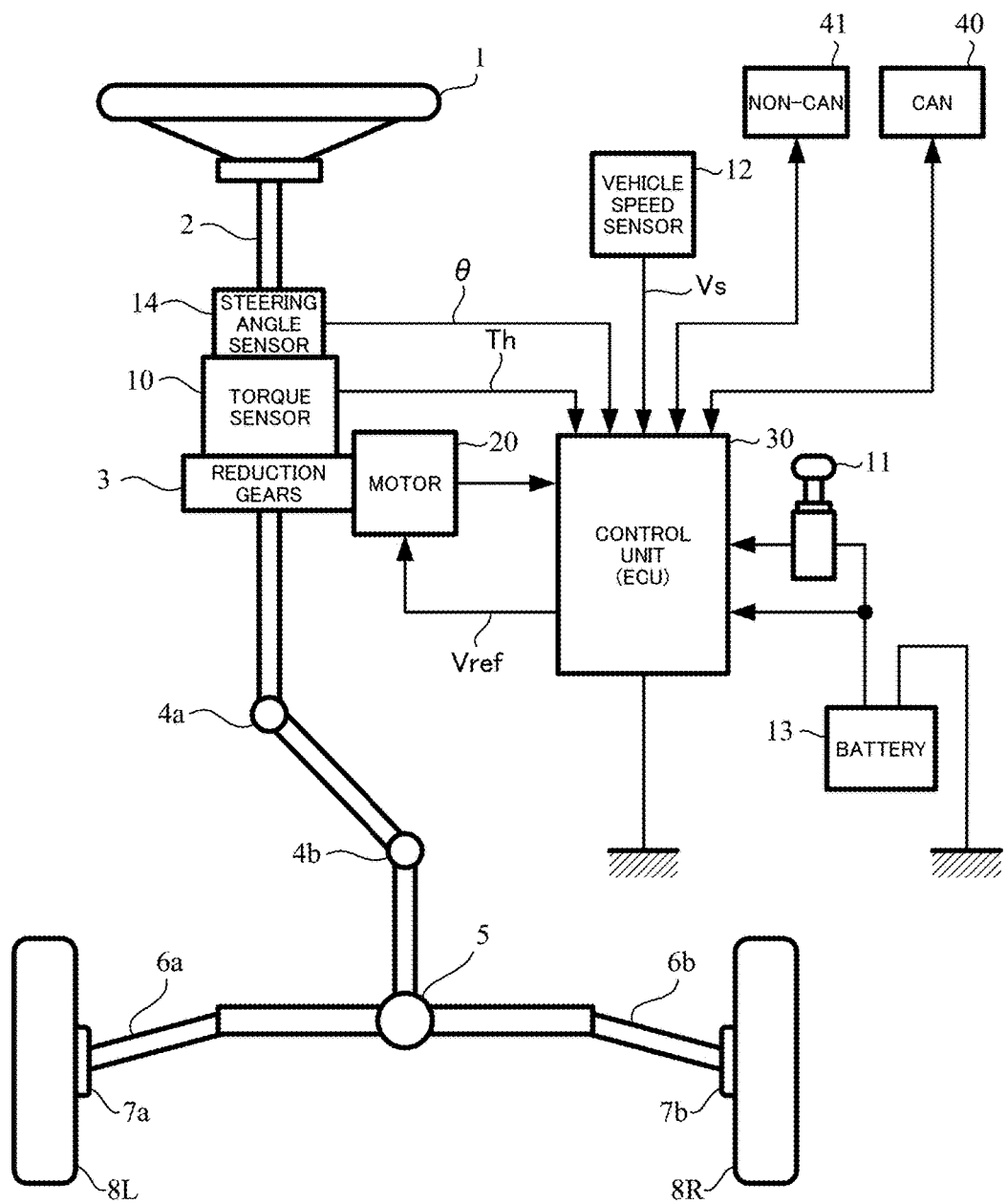
FIG. 1 is a configuration diagram showing a general outline of an electric power steering apparatus.
Figure 2:
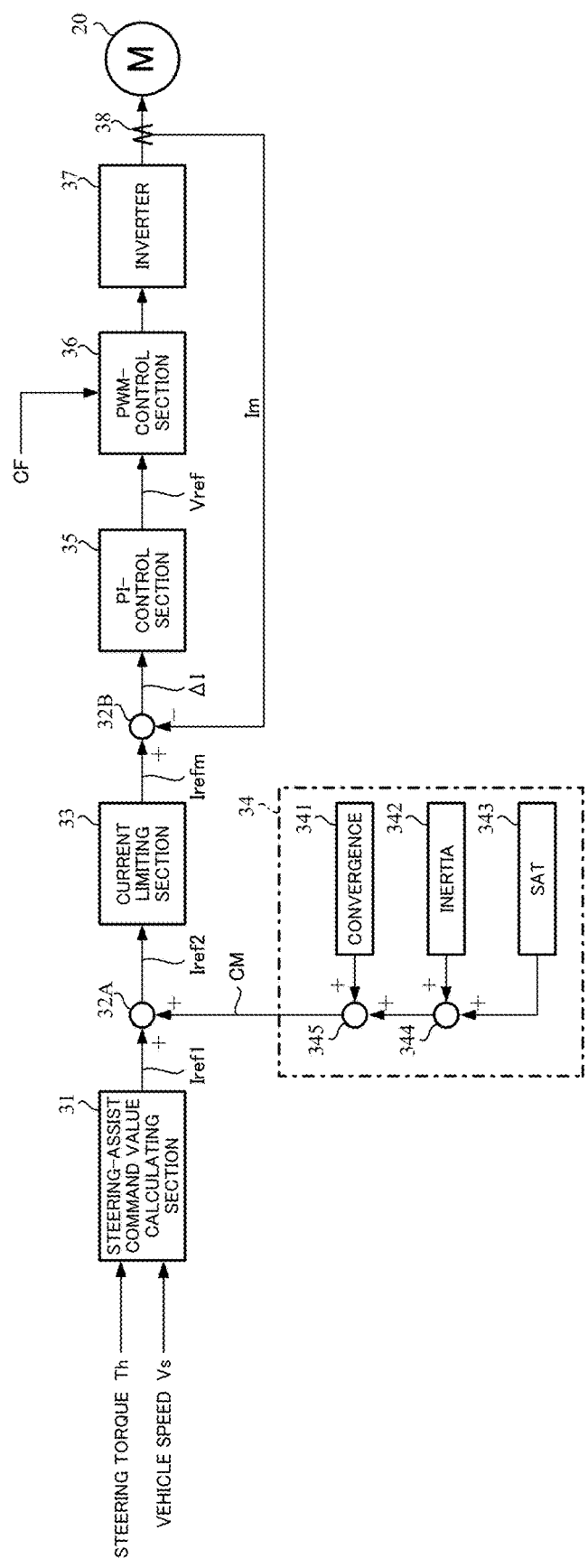
FIG. 2 is a block diagram showing a configuration example of a control unit (ECU) of the electric power steering apparatus.

Into the dead time compensating section 200 (the details will be explained later), the motor terminal voltages Vu, Vv and Vw are respectively inputted via low pass filters (LPFs) 163U, 163V and 163W for removing the noise, and duty command values $Duty_u$, $Duty_v$ and $Duty_w$ from the duty command value calculating section 160A in the PWM-control section 160 are inputted. Further, into the dead time compensating section 400 (the details will be explained later), the steering assist command value iqref of the q-axis corresponding to the assist command value Iref2 in FIG. 2, and the inverter-applying voltage VR and the motor rotational number ω are inputted.

The compensation-value switching section 500 (the details will be explained later) comprises a compensation-value switch judging section 510 to judge the switch of the compensation values based on the steering assist command value iqref and to output a switch judgment flag SF, a mixing-ratio calculating section 520 to calculate a mixing ratio $R_{tA}$ (e.g. 0 to 100%) of the dead time compensating function section (A) 200 and a mixing ratio $R_{tB}$ (e.g. 100 to 0%) of the dead time compensating function section (B) 400 based on the switch judgment flag SF from the compensation-value switch judging section 510, multiplying sections 531 to 534, and adding sections 535 and 536. The dead time compensation values vd* and vq* of the dq-axes are respectively outputted from the adding sections 535 and 536 and are respectively inputted into the adding sections 121d and 121q of the dq-axes control systems.

As well, the multiplying sections 531 to 534 and the adding sections 535 and 536 constitute the mixing section 530.

A d-axis current command value id* and a q-axis current command value iq* of the vector control are respectively inputted into subtracting sections 131d and 131q, and current deviations Δid* and Δiq* for the feed-back currents id and iq are respectively calculated at the subtracting sections 131d and 131q. The calculated current deviation Δid* is inputted into the PI-control section 120d, and the calculated current deviation Δiq* is inputted into the PI-control section 120q. The PI-controlled d-axis voltage command value vd and q-axis voltage command value vq are respectively inputted into the adding section 121d and 121q, the dead time compensation values vd* and vq* from the compensation-value switching section 500 described below are added and compensated at the adding section 121d and 121q, and the compensated voltage values are respectively inputted into the subtracting section 141d and the adding section 141q. The voltage vd1* from the d-q non-interference control section 140 is inputted into the subtracting section 141d, and the voltage command value vd** being the difference is obtained. The voltage vq1* from the d-q non-interference control section 140 is inputted into the adding section 141q, and the voltage command value vq being the added result is obtained. The voltage command value vd and vq** which are dead time-compensated are inputted into a spatial vector modulating section 300 (the details will be explained later) that converts the two phases of the dq-axes into three phases of U-phase, V-phase, W-phase and superimposes the third-harmonic wave. Voltages command values Vu*, Vv*, Vw* of the three phases vector-modulated at the spatial vector modulating section 300 are inputted into the duty command value calculating section 160A in the PWM-control section 160, the duty command values $Duty_u$, $Duty_v$ and $Duty_w$ of the three phases are calculated at the duty command value calculating section 160A, and the duty command values $Duty_u$, $Duty_v$ and $Duty_w$ are inputted into the PWM-control circuit 160B and the dead time compensating section (A) 200. The motor 100 is driving-controlled, via the inverter 161, with the PWM signal ($U_{PWM}$, $V_{PWM}$ and $W_{PWM}$) from the PWM-control circuit 160B as described above.

Next, the dead time compensating section (A) 200 will be described.

Figure 6:
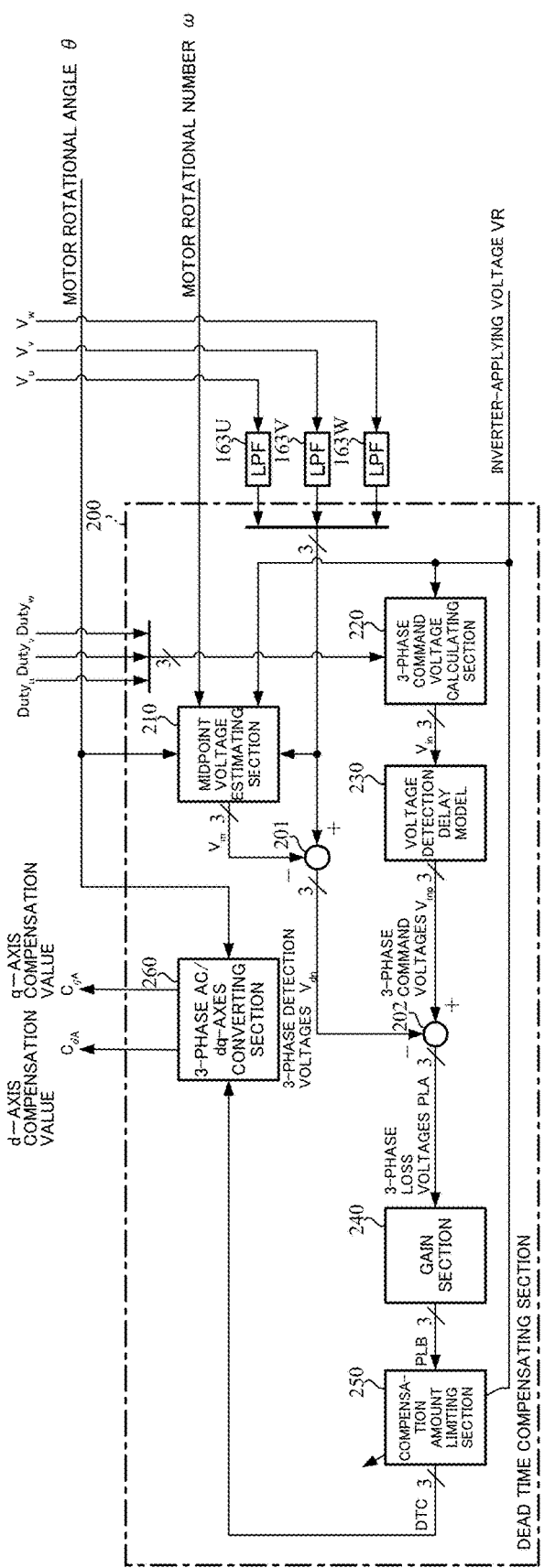
FIG. 6 is a block diagram showing a configuration example of a dead time compensating section (A)

As shown in FIG. 6, the dead time compensating section (A) 200 comprises subtracting sections 201 (201U, 201V and 201W) and 202, a midpoint voltage estimating section 210, a 3-phase command voltage calculating section 220, a voltage detection delay model 230, a gain section 240, a compensation amount limiting section 250, and a 3-phase alternating current (AC)/dq-axes converting section 260 to output the d-axis compensation value CdA and the q-axis compensation value CqA.

Figure 7:
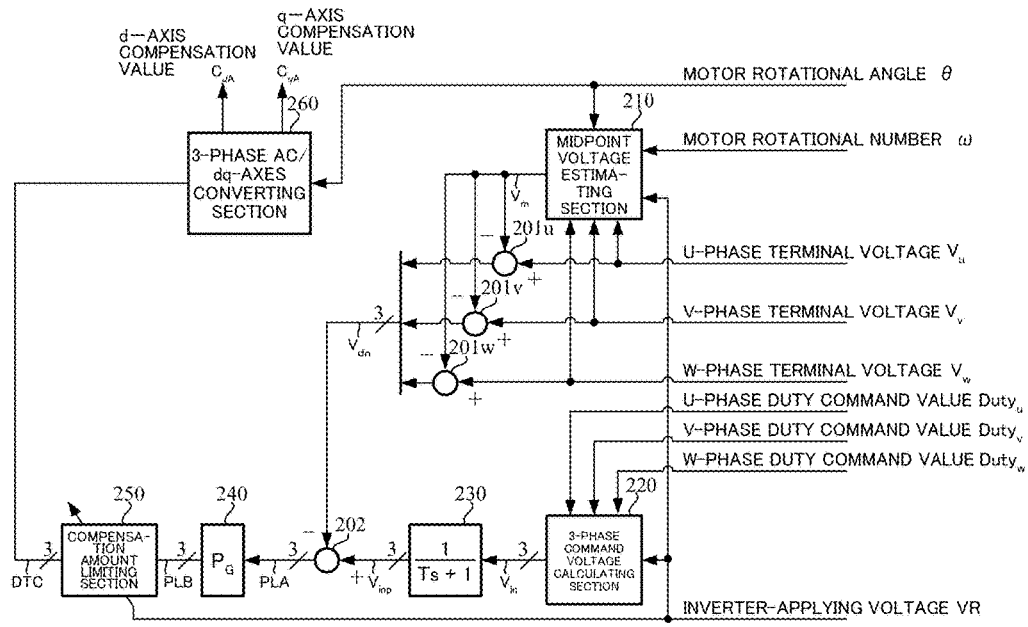
FIG. 7 is a block diagram in details showing a configuration example of a dead time compensating section (A)

The detail configuration is shown in FIG. 7, the motor rotational angle θ is inputted into the midpoint voltage estimating section 210 and the 3-phase AC/dq-axes converting section 260, and the motor rotational number ω is inputted into the midpoint voltage estimating section 210. The motor terminal voltages $V_u$, $V_v$ and $V_w$ are inputted into the midpoint voltage estimating section 210 and the subtracting section 201 (201U, 201V and 201W) via LPFs 163U, 163V and 163W. Further, the 3-phase duties $Duty_u$, $Duty_v$ and $Duty_w$ from the duty command value calculating section 160A in the PWM-control section 160 are inputted into the 3-phase command voltage calculating section 220, and the inverter-applying voltage VR is inputted into the midpoint voltage estimating section 210, the 3-phase command voltage calculating section 220 and the compensation amount limiting section 250.

Figure 8:
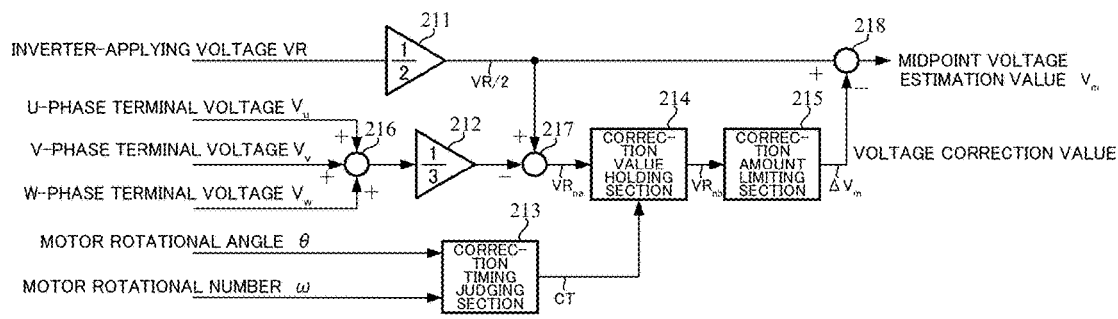
FIG. 8 is a block diagram showing a configuration example of the midpoint voltage estimating section.

The midpoint voltage estimating section 210 calculates a reference voltage of midpoint voltages by using the inverter-applying voltage VR. The detail configuration is shown in FIG. 8, since the midpoint voltages vary depending on the influence of a hardware configuration, a detection error and so on, the correction is performed based on the differences between the inverter-applying voltage VR and the motor terminal voltages $V_u$, $V_v$ and $V_w$. The correction timing is adjusted under conditions of a specific motor rotational angle θ and a specific motor rotational number co.

That is, the inverter-applying voltage VR is reduced by half (VR/2) at a reducing section 211, and a reduced value (VR/2) is addition-inputted into subtracting sections 217 and 218. The motor terminal voltages $V_u$, $V_v$ and $V_w$ are inputted into the adding section 216 and are added, the added result "$V_u+V_v+V_w$" is at a multiplied a dividing section (⅓) 212, and a ⅓-multiplied voltage "$(V_u+V_v+V_w)/3$" is subtraction-inputted into the subtracting section 217. The subtracting section 217 subtracts the voltage "$(V_u+V_v+V_w)/3$" from the reduced value VR/2, and the subtracted value $VR_{na}$ is inputted into a correction value holding section 214. A correction timing judging section 213 judges a correction timing based on the motor rotational angle θ and the motor rotational number ω and inputs a correction signal CT to the correction value holding section 214. The correction amount limiting section 215 calculates a correction amount $ΔV_m$ based on a voltage $VR_{nb}$ held in the correction value holding section 214.

Figure 9:
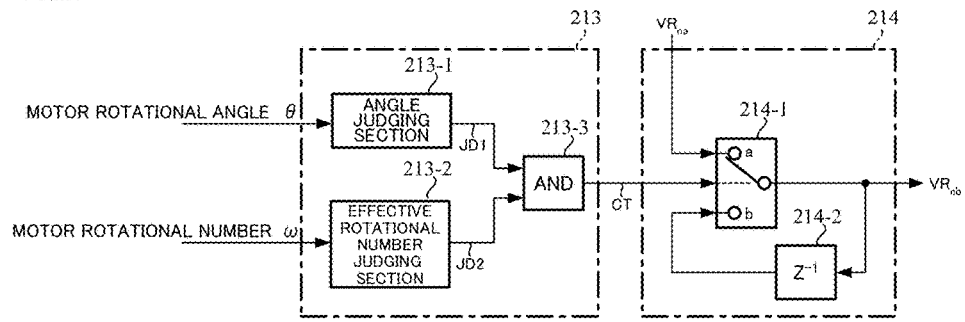
FIG. 9 is a block diagram showing a detail configuration example of the correction timing judging section and the correction value holding section.

The details of the correction timing judging section 213 and the correction value holding section 214 are shown in FIG. 9, the correction timing judging section 213 comprises an angle judging section 213-1, an effective rotational number judging section 213-2 and an AND-circuit 213-3, and the correction value holding section 214 comprises a switching section 214-1 and a holding unit ($Z^{-1}$) 214-2.

That is, the motor rotational angle θ is inputted into the angle judging section 213-1 and the judgment is performed by using the below Expression 1. When the Expression 1 is established, the angle judging section 213-1 outputs a judging signal JD1.

$$179\ [deg] < θ < 180\ [deg] \quad [\text{Expression 1}]$$

In a case that the timing of the above Expression 1 is considered as the correction condition on the calculation of the midpoint correction value, it is possible to accurately sample a voltage value of a zero-cross point. Since the third-harmonic is superimposed on the motor terminal voltages except for the above point, it is impossible to detect more accurate value. For example, considering that the respective terminal voltages detected by the condition of the Expression 1 are $V_u$=6.83 [V], $V_v$=7.55 [V], $V_w$=5.94 [V] and the motor-applying voltage is 13.52 [V], "$(V_u+V_v+V_w)/3$"=6.77 [V] and VR/2=6.76[V] are established, and therefore "VR/2≈$(V_u+V_v+V_w)/3$", the almost midpoint voltage is obtained. Further, when the motor rotational number ω is high, since the influence of the motor back-EMF increases and the sampling precision decreases, it is impossible to perform the accurate correction calculation. Thus, the effective rotational number judging section 213-2 judges whether the motor rotational number ω is equal to or less than an effective rotational number $ω_0$ being capable of correction-calculating, or not. When the motor rotational number ω is equal to or less than the effective rotational number $ω_0$, the effective rotational number judging section 213-2 outputs the judging signal JD2.

$$ω ≤ ω_0 \quad [\text{Expression 2}]$$

The judging signals JD1 and JD2 are inputted into the AND-circuit 213-3, and the correction signal CT is outputted in accordance with the AND-condition that the judging signals JD1 and JD2 are inputted. The correction signal CT is inputted into the switching section 214-1 in the correction value holding section 214 as a switching signal and switches contact points "a" and "b". The subtracted result $VR_{na}$ is inputted into the contact point "a", and the output voltage $VR_{nb}$ is inputted into the contact point "b" via the holding unit ($Z^{-1}$) 214-2. The correction value holding section 214 holds a value in order to output a stable correction value till a next timing. Further, in a case that the correction amount is clearly greater than a normal value due to the noise, the back-EMF, the correction timing miss-judgment and so on, the correction amount limiting section 215 judges that the present correction amount is not right and limits the maximum value. The maximum limited voltage correction value $\Delta V_m$ is inputted into the subtracting section 218, and the midpoint voltage estimation value $V_m$ calculated in accordance with the below Expression 3 at the subtracting section 218 is outputted. The midpoint voltage estimation value $V_m$ is subtraction-inputted into the subtracting section 201 (201U, 201V and 201W).

$$V_m = \frac{VR}{2} - \Delta V_m \qquad \text{[Expression 3]}$$

Furthermore, the 3-phase duty command values $Duty_u$, $Duty_v$ and $Duty_w$ and the inverter-applying voltage VR are inputted into the 3-phase command voltage calculating section 220, and the 3-phase command voltage calculating section 220 calculates the 3-phase command voltages $V_{in}$ by using the below Expression 4 in accordance with the 3-phase duty command values $Duty_u$, $Duty_v$ and $Duty_w$ and the inverter-applying voltage VR. The 3-phase command voltages $V_{in}$ are inputted into the voltage detection delay model 230. As well, "$Duty_{ref}$" in the Expression 4 denotes $Duty_u$, $Duty_v$ and $Duty_w$.

$$V_{in} = VR \times \frac{(Duty_{ref} - Duty_{50\%})}{Duty_{100\%}} \qquad \text{[Expression 4]}$$

The midpoint estimation value $V_m$ is subtraction-inputted into the subtracting section 201 (201U, 201V and 201W), and further the 3-phase terminal voltages $V_u$, $V_v$ and $V_w$ passed the LPFs 163U, 163V and 163W are subtraction-inputted into the subtracting section 201 (201U, 201V and 201W). The subtracting sections 201U, 201V and 201W subtract the midpoint estimation value $V_m$ from the 3-phase motor terminal voltages $V_u$, $V_v$ and $V_w$ in accordance with the below Expression 5. Thereby, 3-phase detection voltages $V_{dn}$ ($V_{du}$, $V_{dv}$ and $V_{dw}$) are obtained. The 3-phase detection voltages $V_{dn}$ ($V_{du}$, $V_{dv}$ and $V_{dw}$) are inputted into the subtracting section 202 serving as a 3-phase loss voltage calculating section.

$$V_{du} = V_u - V_m$$

$$V_{dv} = V_v - V_m$$

$$V_{dw} = V_w - V_m \qquad \text{[Expression 5]}$$

The detection of the 3-phase terminal voltages $V_u$, $V_v$ and $V_w$ has a delay due to a noise filter or the like in the ECU. Consequently, in a case that the loss voltages are directly calculated by obtaining the differences between the 3-phase command value voltages $V_{in}$ and the 3-phase detection voltages $V_{dn}$ the error occurs due to the phase difference. In order to resolve this problem, the present embodiment approximates the detection delay of the hardware such as a filter circuit as a first order filter model and improves the phase difference. The voltage detection delay model 230 of the present embodiment is a primary filter of the below Expression 6 and "T" denotes a filter time constant. The voltage detection delay model 230 may be a model of a secondary filter or higher order filter.

$$\frac{1}{Ts+1} \qquad \text{[Expression 6]}$$

The 3-phase command voltages $V_{in}$ is addition-inputted into the subtracting section 202, and the 3-phase detection voltages $V_{dn}$ are subtraction-inputted into the subtracting section 202. The 3-phase loss voltages PLA ($V_{loss\_n}$) are calculated by subtracting the 3-phase detection voltages $V_{dn}$ from the 3-phase command voltages $V_{in}$. That is, the subtracting section 202 performs the below Expression 7.

$$V_{loss\_u} = V_{inu} - V_{du}$$

$$V_{loss\_v} = V_{inv} - V_{dv}$$

$$V_{loss\_w} = V_{inw} - V_{dw} \qquad \text{[Expression 7]}$$

The 3-phase loss voltages PLA ($V_{loss\_n}$) are multiplied with a gain $P_G$ (for example, "0.8") at the gain section 240, and the 3-phase loss voltages PLA multiplied with the gain $P_G$ are inputted into the compensation amount limiting section 250. Although the gain $P_G$ is not basically needed to adjust, the gain $P_G$ is changed in a case that an output adjustment is needed when the matching for another compensating members, an actual vehicle tuning and parts of the ECU are changed.

Figure 10:
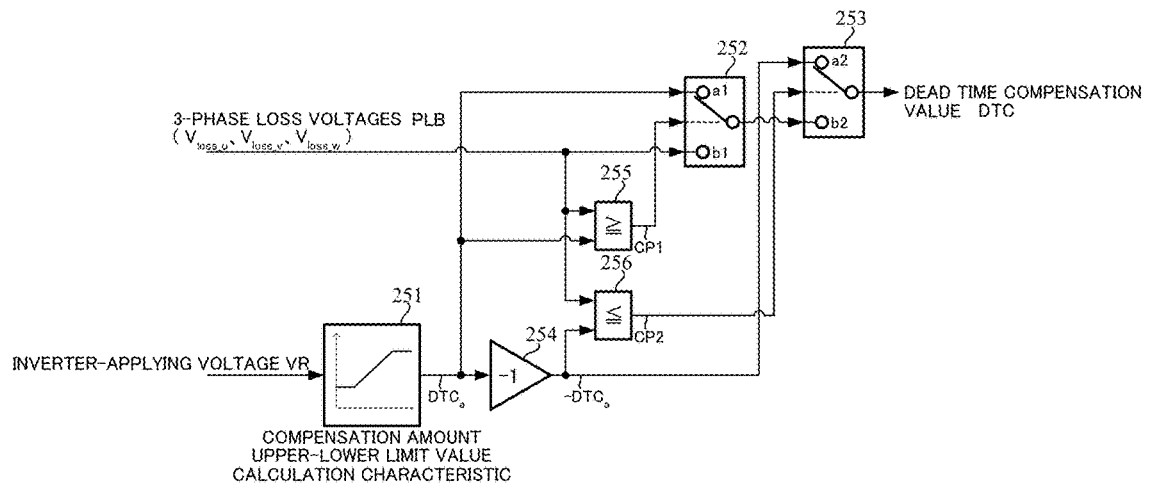
FIG. 10 is a block diagram showing a detail configuration example of the correction amount limiting section.
Figure 11:
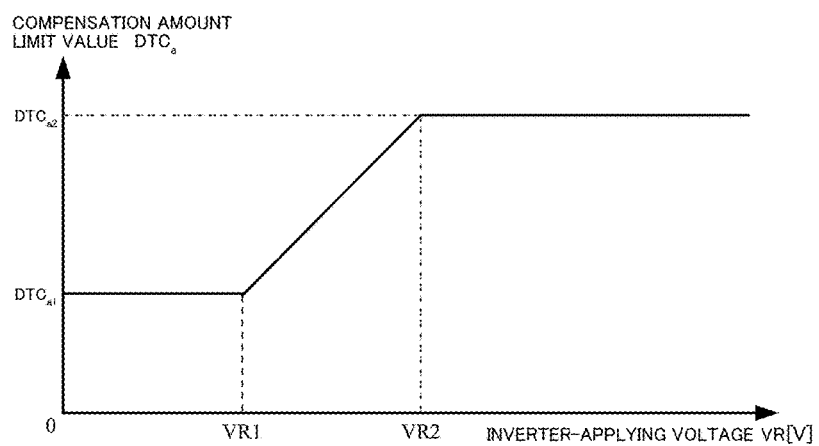
FIG. 11 is a characteristic chart showing an example of the compensation amount upper-limit value.

The compensation amount limiting section 250 is sensitive to the inverter-applying voltage VR, and the detail configuration is shown in FIG. 10. The inverter-applying voltage VR is inputted into a compensation upper-lower limit value calculating section 251 in the compensation amount limiting section 250, and a compensation amount limit value DTCa is calculated with a characteristic as shown in FIG. 11. The compensation amount limit value DTCa is a constant limit value=Ca1 when the inverter-applying voltage VR is lower than a predetermined voltage VR1, linearly (or nonlinearly) increases when the inverter-applying voltage VR is equal to or higher than the predetermined voltage VR1 and is lower than a predetermined voltage VR2 (>VR1), and holds a constant limit value DTCa2 when the inverter-applying voltage VR is equal to or higher than the predetermined voltage VR2. The compensation amount limit value DTCa is inputted into a contact point a1 of the switching section 252, a comparing section 255 and an inverting section 254. Further, the 3-phase loss voltages PLB ($V_{loss\_u}$, $V_{loss\_v}$, $V_{loss\_w}$) are inputted into comparing sections 255 and 256 and a contact point b1 of the switching section 252. An output "-DTCa" of the inverting section 254 is inputted into a contact point a2 of the switching section 253. The contact points a1 and b1 are switched based on a compared result CP1 of the comparing section 255, and the contact points a2 and b2 are switched based on a compared result CP2 of the comparing section 256.

The comparing section 255 compares the compensation amount limit value DTCa with the 3-phase loss voltages PLB and switches the contact points a1 and b1 of the switching section 252 in accordance with the below Expression 8. Further, the comparing section 256 compares the compensation amount limit value "-DTCa" with the 3-phase loss voltages PLB and switches the contact points a2 and b2 of the switching section 253 in accordance with the below Expression 9.

When the 3-phase loss voltages PLB the compensation amount upper-limit value (DTCa), the contact point a1 of the switching section 252 is ON (the contact point b2 of the switching section 253=DTCa).

When the 3-phase loss voltages PLB<the compensation amount upper-limit value (DTCa), the contact point b1 of the switching section 252 is ON (the contact point b2 of the switching section 253=the 3-phase loss voltages PLB). [Expression 8]

When the 3-phase loss voltages PLB the compensation amount lower-limit value (−DTCa), the contact point a2 of the switching section 253 is ON (the dead time compensation value DTC=−DTCa). When the 3-phase loss voltages PLB>the compensation amount lower-limit value (−DTCa), the contact point b2 of the switching section 253 is ON (the dead time compensation value DTC=the output of the switching section 252). [Expression 9]

The dead time compensation values DTC of the three phases are inputted into the 3-phase AC/dq-axes converting section 260 with the motor rotational angle θ, and the d-axis compensation value CdA and the q-axis compensation value CqA converted to the two phases are outputted from the 3-phase AC/dq-axes converting section 260. The d-axis compensation value CdA and the q-axis compensation value CqA are inputted into the compensation-value switching section 500.

Next, the dead time compensating section (B) 400 will be described.

Figure 12:
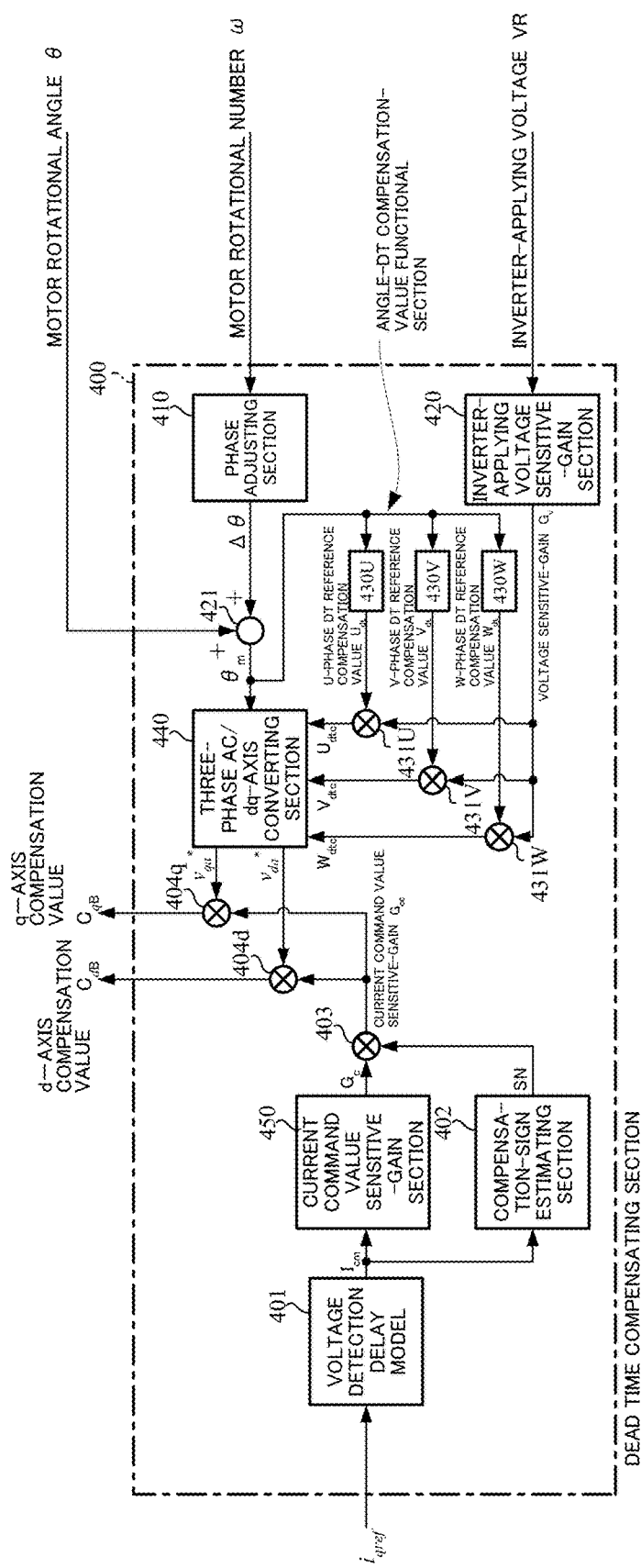
FIG. 12 is a block diagram showing a configuration example of a dead time compensating section (B)

As shown in FIG. 12, the dead time compensating section (B) 400 comprises a current control delay section 401, a compensation-sign estimating section 402, multiplying sections 403, 404d and 404q, an adding section 421, a phase adjusting section 410, an inverter-applying voltage sensitive-gain section 420, angle—dead time compensation-value functional sections 430U, 430V and 430W, multiplying sections 431U, 431V and 431W, a 3-phase alternative current (AC)/dq-axes converting section 440 and a current command value sensitive-gain section 550. The d-axis compensation value CdB and the q-axis compensation value CqB are respectively outputted from the multiplying sections 404d and 404q.

As well, the multiplying sections 431U, 431V and 431W and the 3-phase AC/dq-axes converting section 440 constitute a dead time compensation-value outputting section. Further, the current control delay section 401, the compensation-sign estimating section 402, the current command value sensitive-gain section 450 and the multiplying section 403 constitute a current command value sensitive-gain calculating section.

Figure 13:
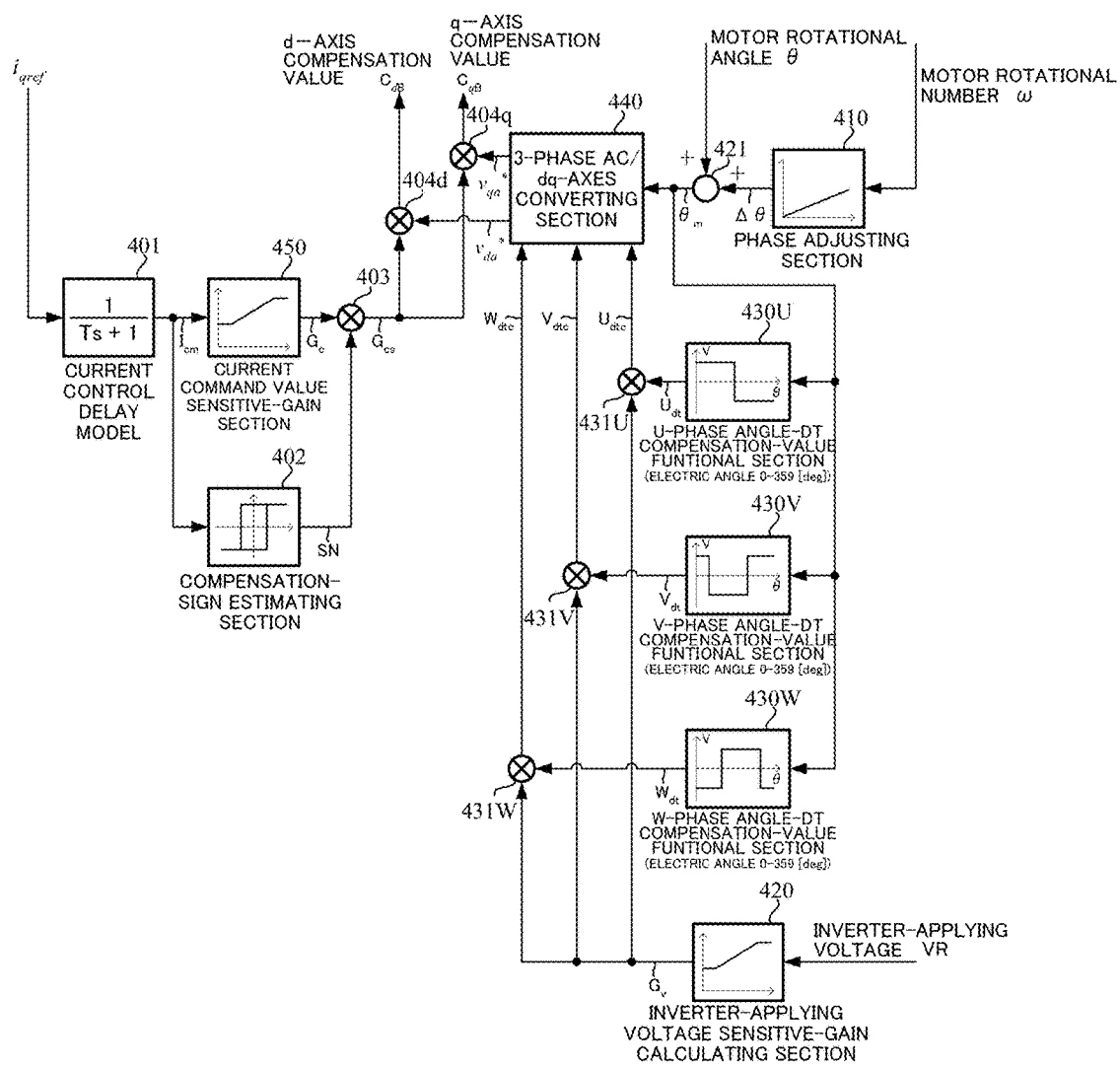
FIG. 13 is a block diagram in details showing a configuration example of the dead time compensating section (B)

The detail configuration of the dead time compensating section 400 is shown in FIG. 13, and hereinafter the explanation will be described with reference to FIG. 13.

The q-axis steering assist command value iqref is inputted into the current control delay model 401. The delay occurs due to the noise filters or the like in the ECU till the dq-axes current command values id* and iq* are reflected to the actual currents. Thus, when the sign is directly judged from the current command value iq*, the timing shift is occurred sometime. In order to resolve the problem, the delay of the whole current control is approximated as a primary filter model and then the phase shift is improved. The current control delay model 401 is the primary filter expressed by the above Equation 6, where "T" is a filter time constant. The current control delay model 401 may be a secondary filter being equal to or more than two order.

A current command value Icm outputted from the current control delay model 401 is inputted into the current command value sensitive-gain section 450 and the compensation-sign estimating section 402. The dead time compensation amount sometime becomes overcompensation in the low current region, and therefore the current command value sensitive-gain section 450 has a function to calculate a gain Gc lowering the compensation amount depending on the current command value Icm (the steering assist command value iqref). Further, the current command value sensitive-gain section 450 uses a weighted average filter 454 so that the gain Gc lowering the compensation amount does not vibrate due to the noise from the current command value Icm (the steering assist command value iqref) or the like, and aims to reduce the noise.

Figure 14:
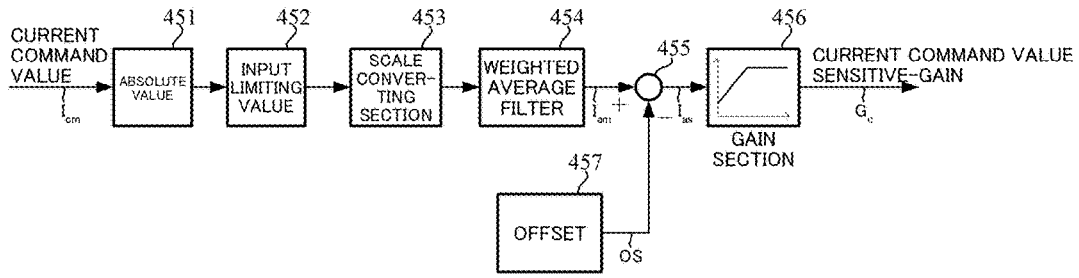
FIG. 14 is a block diagram showing a configuration example of a current command value sensitive-gain section.
Figure 15:
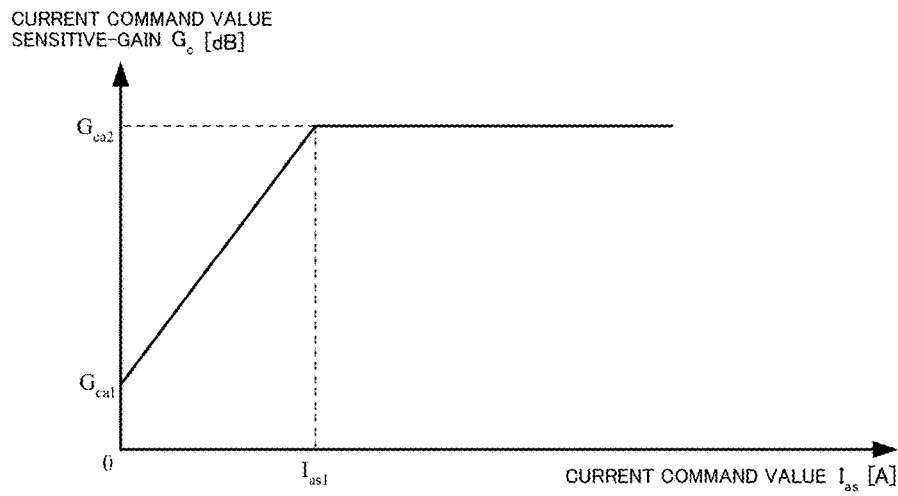
FIG. 15 is a characteristic diagram of a gain section in the current command value sensitive-gain section.

The configuration of the current command value sensitive-gain section 450 is shown in FIG. 14, and the current command value Icm becomes an absolute value |Icm| at an absolute value section 451. The absolute value |Icm| is limited the maximum value at an input limiting section 452, and the current command value of the absolute value whose maximum current is limited is inputted into the weighted average filter 454. The current command value Iam that the noise is reduced at the weighted average filter 454 is addition-inputted into a subtracting section 455, and the inputted current command value Iam is subtracted a predetermined offset OS at the subtracting section 455. The reason of the subtraction of the offset OS is to prevent an occurrence of chattering due to a minute current command value, and the input value being equal to or less than the offset OS is fixed to the minimum gain. The offset OS is a constant value. The current command value Ias which is subtracted the offset OS at the subtracting section 255 is inputted into a gain section 456, and the gain section 456 outputs a current command value sensitive-gain Gc according to a gain characteristic as shown in FIG. 15.

Figure 16:
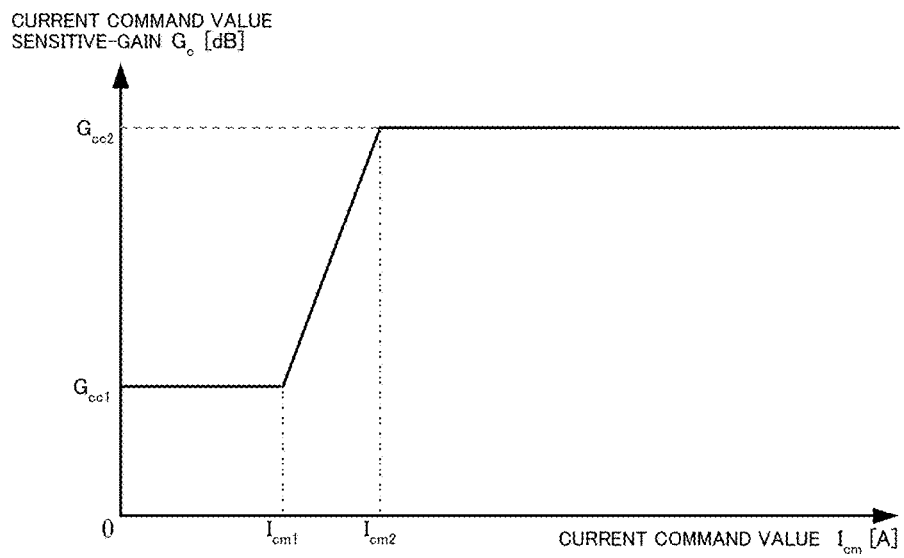
FIG. 16 is a characteristic diagram showing a characteristic example of the current command value sensitive-gain section.

The current command value sensitive-gain Gc outputted from the current command value sensitive-gain section 450 is a characteristic for the inputted current command value Icm, for example, as shown in FIG. 16. That is, the current command value sensitive-gain Gc is a constant gain Gcc1 till a predetermined current Icm1, linearly (nonlinearly) increases from the predetermined current Icm1 to a predetermined current Icm2 (>Icm1), and holds a constant gain Gcc2 more than the predetermined current Icm2. Besides, the predetermined current Icm1 may be zero.

Figure 17A:
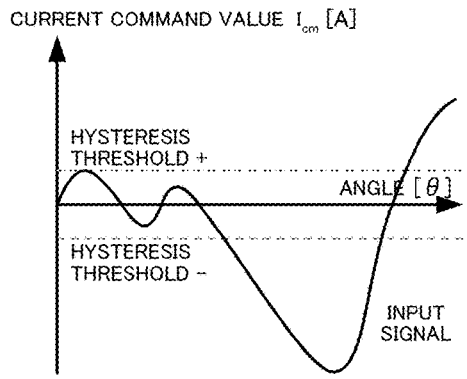
FIGS. 17A and 17B are waveform charts showing an operation example of a compensation-sign estimating section.
Figure 17B:
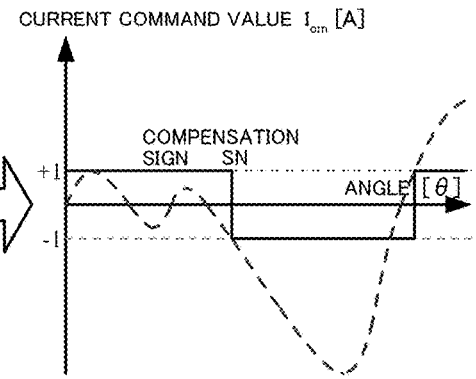

The compensation-sign estimating section 402 outputs a compensation sign SN of a positive (+1) or a negative (−1) with a hysteresis characteristic shown in FIGS. 17A and 17B for the current command value Icm. Although the compensation sign is estimated as a reference being a point that the current command value Icm crosses zero, the hysteresis characteristic is set for suppressing the chattering. The estimated compensation sign SN is inputted into the multiplying section 403. As well, the positive and negative thresholds of the hysteresis characteristic are appropriately changeable.

The current command value sensitive-gain Gc from the current command value sensitive-gain section 450 is inputted into the multiplying section 403, and the multiplying section 403 outputs a current command value sensitive-gain Gcs (=Gc×SN) multiplied the compensation sign SN. The current command value sensitive-gain Gcs is inputted into the multiplying sections 404d and 404q.

Figure 18:
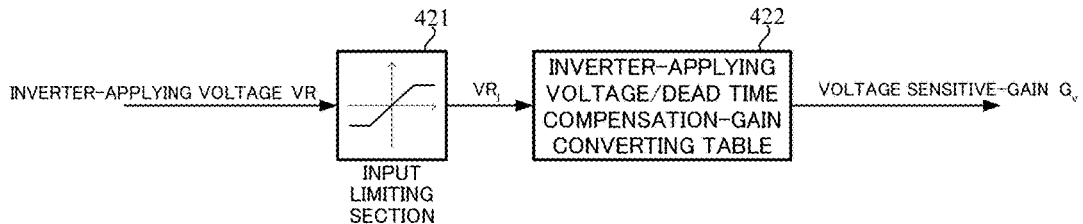
FIG. 18 is a block diagram showing a configuration example of an inverter-applying voltage sensitive-gain section.
Figure 19:
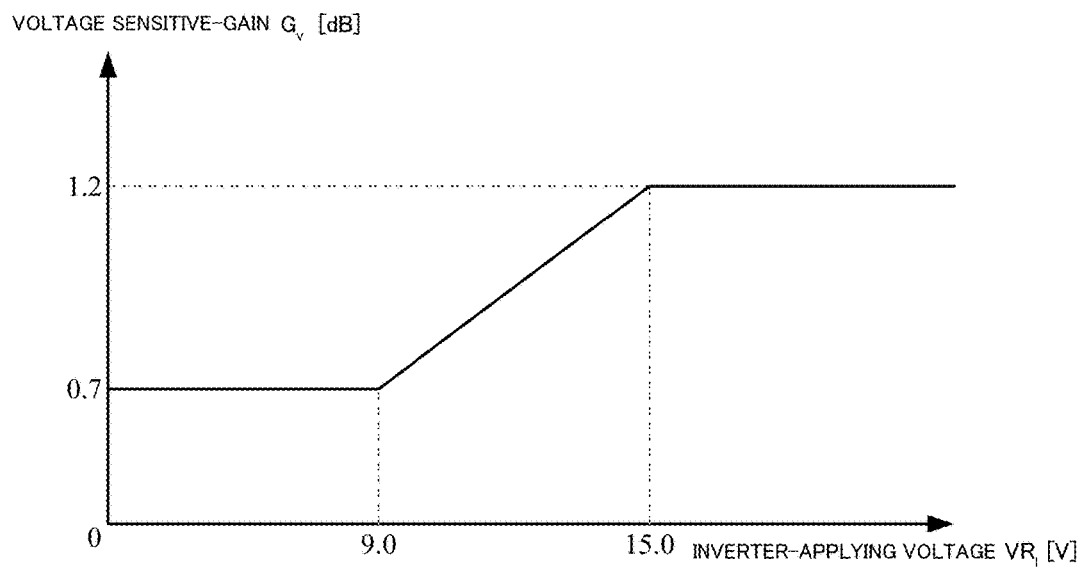
FIG. 19 is a characteristic diagram showing a characteristic example of the inverter-applying voltage sensitive-gain section.

Since the most suitable compensation amount varies depending on the inverter-applying voltage VR, the dead time compensating section 400 calculates the dead time compensation amount corresponding to the inverter-applying voltage VR and changes it. The inverter-applying voltage sensitive-gain section 420 inputting the inverter-applying voltage VR and outputting a voltage sensitive-gain Gv is the configuration shown in FIG. 18. The inverter-applying voltage VR is limited the positive and negative maximum values at the input limiting section 421, and the inverter-applying voltage VR1 of which the maximum values are limited is inputted into an inverter-applying voltage/dead time compensation-gain converting table 422. The characteristic of the inverter-applying voltage/dead time compensation-gain converting table 422 is shown, for example, in FIG. 19. The inverter-applying voltages 9.0 [V] and 15.0 [V] of the inflection points and the voltage sensitive gains "0.7" and "1.2" are respectively examples and they are appropriately changeable. The voltage sensitive gain Gv is inputted into the multiplying sections 431U, 431V and 431W.

Figure 20:
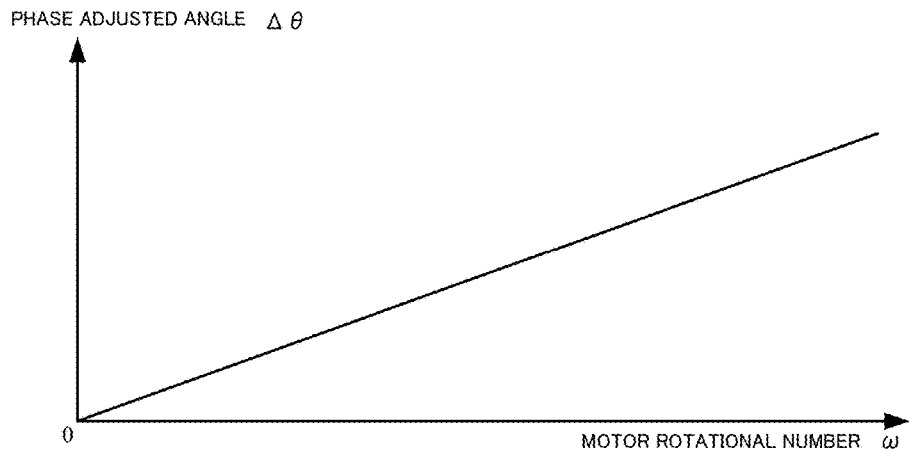
FIG. 20 is a characteristic diagram showing a characteristic example of a phase adjusting section.

In a case that the dead time compensation timing is led or delayed by the motor rotational number co, there is provided the phase adjusting section 410 for a function to calculate a adjusted angle in accordance with the motor rotational number co. The phase adjusting section 410 has a characteristic as shown in FIG. 20 in a case of a lead angle control, and the calculated phase adjusted angle $\Delta\theta$ is inputted into the adding section 421 and is added with the detected motor rotational angle $\theta$. The motor rotational angle $\theta m$ (=$\theta+\Delta\theta$) being an added result at the adding section 421 is inputted into angle—dead time compensation-value functional sections 430U, 430V and 430W and the 3-phase AC/dq-axes converting section 440.

Figure 21:
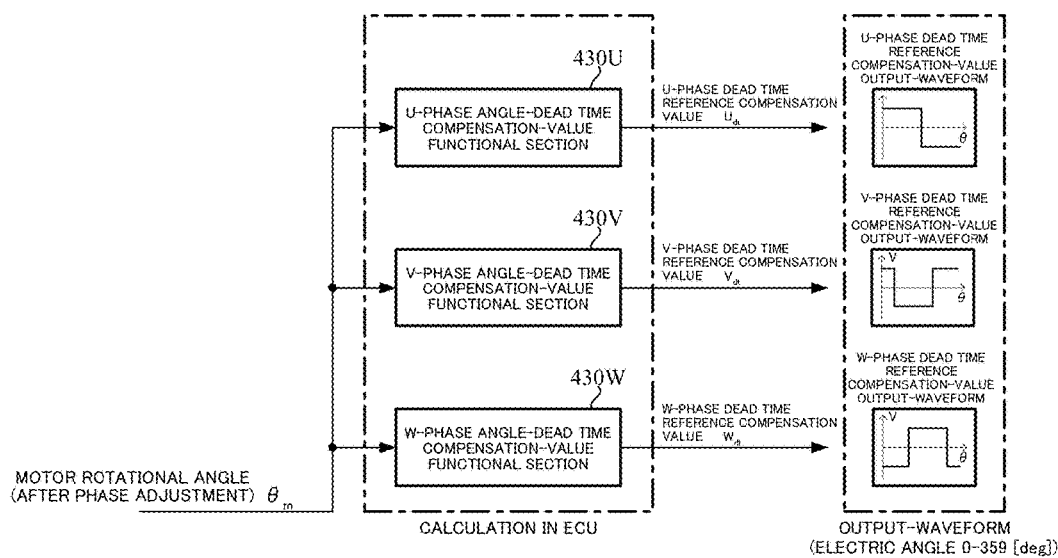
FIG. 21 is a diagram showing an operation example of a respective phase-angle—dead time compensation-value functional section.

As the details of the angle—dead time compensation-value functional sections 430U, 430V and 430W are shown in FIG. 21, they output respective phase dead time reference compensation values Udt, Vdt and Wdt of rectangular wave of which phases are respectively shifted by 120 [deg] in a range of the electric angle "0" to "359" [deg] for the motor rotational angel $\theta m$ of which phase is adjusted. The angle-dead time compensation-value functional sections 430U, 430V and 430W obtain the dead time compensation values needed in the three phases as the functions due to the angle, calculate on a real time of the ECU, and output the dead time reference compensation values Udt, Vdt and Wdt. The angle functions of the dead time reference compensation values are different depending on the characteristic of the dead time of the ECU.

The dead time reference compensation values Udt, Vdt and Wdt are respectively inputted into the multiplying sections 431U, 431V and 431W, and are multiplied with the voltage sensitive-gain Gv. The dead time compensation values Udtc (=Gv×Udt), Vdtc (=Gv×Vdt) and Wdtc (=Gv×Wdt) of the three phases are inputted into the 3-phase AC/dq-axes converting section 440. The 3-phase AC/dq-axes converting section 440 converts the dead time compensation values Udtc, Vdtc and Wdtc of the three phases into the dead time compensation values vda* and vqa* of the dq-axes. The dead time compensation values vda* and vqa* are respectively inputted into the multiplying sections 404$d$ and 404$q$, and are multiplied with the current command value sensitive-gain Gcs. The multiplied results at the multiplying sections 404$d$ and 404$q$ are the compensation values CdB and CqB of the dq-axes, and then are inputted into the compensation-value switching section 500.

The compensation values CdA and CqA from the dead time compensating section (A) 200 are respectively inputted into the multiplying sections 531 and 533 in the compensation-value switching section 500, and the compensation values CdB and CqB from the dead time compensating section (B) 400 are respectively inputted into the multiplying sections 532 and 534 in the compensation-value switching section 500.

The compensation-value switch judging section 510 in the compensation-value switching section 500 has a dead band for the input of the steering assist command value iqref, outputs the switch judgment flag SF (e.g. logic "H"), and has a hysteresis characteristic. The switch judgment flag SF is inputted into the mixing-ratio calculating section 520, and the mixing-ratio calculating section 520 calculates the ratio $R_{tA}$ (%) of the compensating section (A) 200 and the ratio $R_{tB}$ (%) of the compensating section (B) 400.

Figure 22:
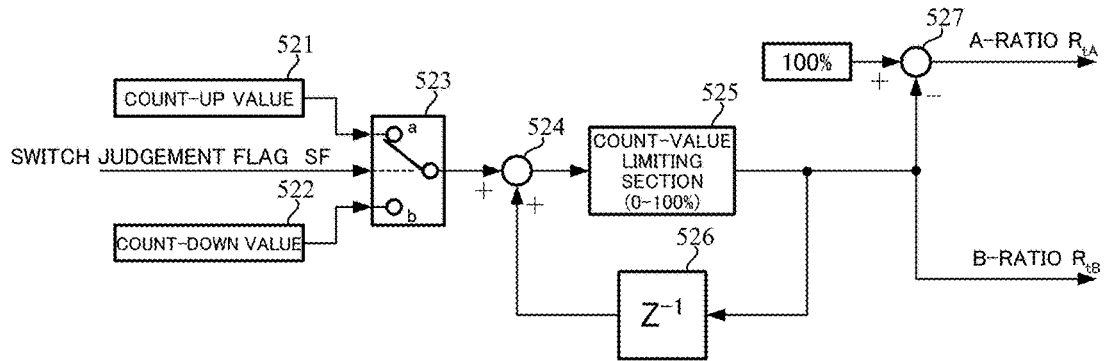
FIG. 22 is a block diagram showing a configuration example of a mixing-ratio calculating section.

The mixing-ratio calculating section 520 is the configuration as shown in FIG. 22 and includes a switch 523 having contact points "a" and "b" being switched by the switch judgment flag SF. A count-up value 531 is inputted into the contact point "a", and a count-down value 532 is inputted into the contact point "b". For example, the count-up value 521 is outputted from the switch 523 by connecting to the contact point "a" when the switch judgment flag SF is not inputted, and then the count-down value 522 is outputted from the switch 523 by switching to the contact point "b" when the switch judgment flag SF is inputted. The output of the switch 523 is inputted into an adding section 524, the added value is limited the maximum value at the count-value limiting section (0-100%) 525, and the limited value is outputted as the ratio $R_{tB}$ (%). Further, the ratio $R_{tB}$ (%) is subtraction-inputted into a subtracting section 527 and is inputted into the adding section 524 via a holding unit ($Z^{-1}$) 526. The ratio $R_{tB}$ (%) is inputted into the subtracting section 527 and is subtracted from the fixed value 100%, and the subtracted result is outputted as the ratio $R_{tA}$ (%). As a result, the ratio $R_{tA}$ linearly changes from 100% to 0%, the ratio $R_{tB}$ linearly changes from 0% to 100%, and it is possible to obtain the ratios $R_{tA}$ and $R_{tB}$ of the characteristics as shown by the real lines in FIG. 23. Besides, there is always a relation of the below Expression 10 between the ratios RtA and RtB.

$$RtA\ (\%)+RtB\ (\%)=100\%\qquad\text{[Expression 10]}$$

Figure 23:
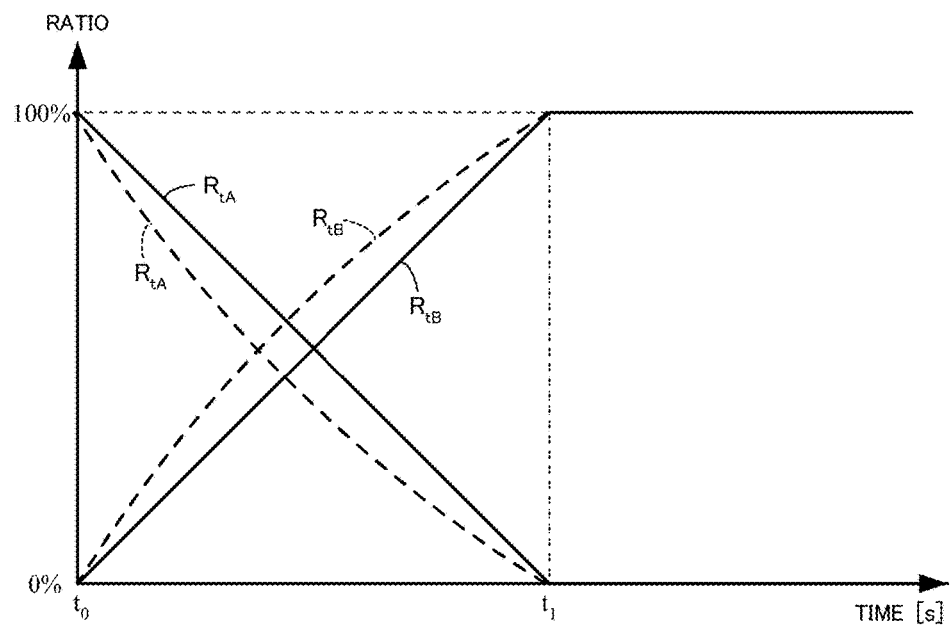
FIG. 23 is a characteristic diagram showing a characteristic example of a mixing ratio.

Although time points $t_0$ to $t_1$ in FIG. 23 are a switching (shifting) term by the mixing operation, the switching term is changeable by changing the magnitude of the count-values (the count-up value 521 and the count-down value 522). Further, it is possible to change the switching rate by increasing or decreasing the count-up value 521 and the count-down value 522.

As well, it is also possible to nonlinearly change as shown by dotted lines in FIG. 23.

The ratio $R_{tA}$ calculated as stated above is inputted into the multiplying sections 531 and 533, and the ratio $R_{tB}$ is inputted into the multiplying sections 532 and 534. The d-axis compensation value CdA and the q-axis compensation value CqA from the dead time compensating section (A) 200 are respectively inputted into the multiplying sections 531 and 533, and the d-axis compensation value CdB and the q-axis compensation value CqB from the dead time compensating section (B) 400 are respectively inputted into the multiplying sections 532 and 534. As a result, "$R_{tA}\cdot CdA$" is outputted from the multiplying section 531 and is inputted into the adding section 535, and "$R_{tA}\cdot CgA$" is outputted from the multiplying section 533 and is inputted into the adding section 536. Similarly, "$R_{tB}\cdot CdB$" is outputted from the multiplying section 532 and is inputted into the adding section 535, and "$R_{tB} \cdot CqB$" is outputted from the multiplying section 534 and is inputted into the adding section 536. Thus, the dead time compensation values vd* and vq* expressed by the below Expression 11 are respectively outputted from the adding sections 535 and 536, and the dead time compensation values vd* and vq* are respectively inputted into the adding sections 121d and 121q so as to perform the dead time compensation.

$$vd^* = R_{tA} \cdot CdA + R_{tB} \cdot CdB$$

$$vq^* = R_{tA} \cdot CqA + R_{tB} \cdot CqB$$

Figure 24B:
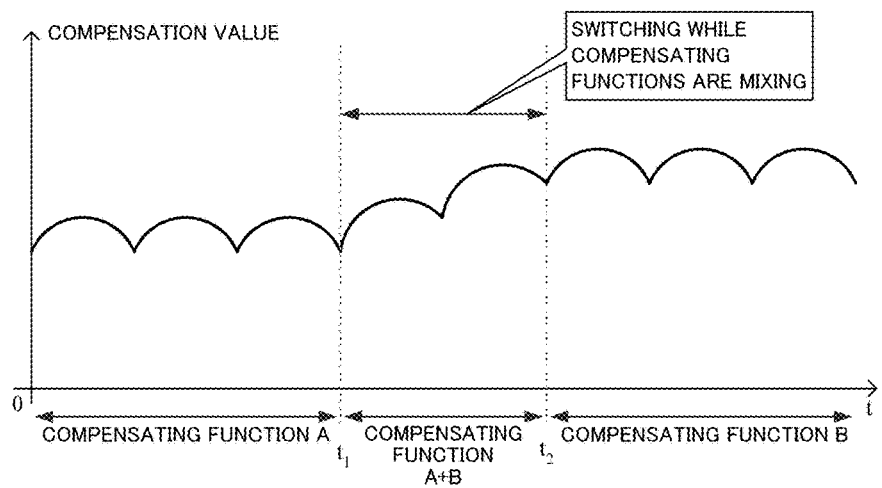

Since the ratios $R_{tA}$ and $R_{tB}$ have the relation (FIG. 23) expressed by the above Expression 10, it is possible to smoothly switch the dead time compensation values (vd*, vq*) depending on the changes of the ratios $R_{tA}$ and $R_{tB}$ as shown in FIG. 24B. In FIG. 24B, the dead time compensation is performed by the compensating function A (100%) till the time point $t_1$, and the switch to the compensating function B is commanded by the compensation-value switch judging section 510 at the time point $t_1$. However, the present invention does not immediately perform the shifting operation to the compensating function B (100%). In the present invention, the ratio of the compensating function A is gradually decreased and the ratio of the compensating function B is gradually increased since the time point $t_1$, and the ratio of the compensating function A becomes o % at the time point $t_2$ and the ratio of the compensating function B becomes 100% at the time point $t_2$. Accordingly, the term between the time points $t_1$ and $t_2$ is the compensation of the compensating function "A+B", and the dead time compensation of the compensating function B (100%) is performed since the time point $t_0$. Therefore, the smooth characteristic change is obtained. FIG. 24A shows the case that switching is immediately performed at a time point $t_0$.

Figure 25:
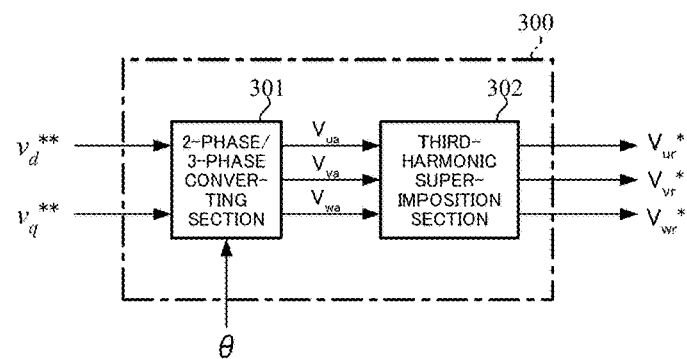
FIG. 25 is a block diagram showing a configuration example of a spatial vector modulating section.

Next, the spatial vector modulation will be described. The spatial vector modulating section 300 may have a function that converts 2-phase voltages (vd, Vq) on the dq-axes space into 3-phase voltages (Vua, Vva, Vwa) and a third-harmonic waveform to the 3-phase voltages (Vua, Vva, Vwa) as shown in FIG. 25**. For example, the spatial vector modulating methods proposed in Japanese Publication Unexamined Patent No. 2017-70066, WO/2017/098840 (Japanese Patent Application No. 2015-239898) and so on by the present applicant may be used.

Figure 26:
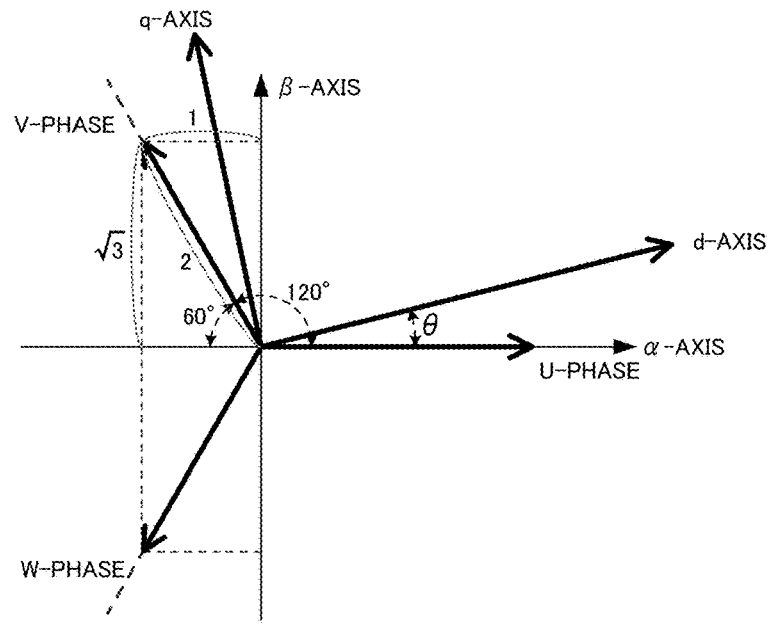
FIG. 26 is a diagram showing an operation example of the spatial vector modulating section.

That is, the spatial vector modulation performs the below coordinate transformation based on the voltage command values vd and vq of the dq-axes space, the motor rotational angle θ and a sector number n (#1 to #6), and controls ON/OFF of the FETs (upper-arm Q1, Q3, Q5; lower-arm Q2, Q4, Q6) of the bridge type inverter. By supplying switching patterns S1 to S6 corresponding to the sectors #1 to #6 to the motor, it has a function to control the rotation of the motor. Regarding the coordinate transformation, in the spatial vector modulation, the voltage command values vd and vq are coordinate-transformed to voltage vectors Vα and Vβ on an α-β coordinate system based on the below Equation 12. A relation between the coordinate axis and the motor rotational angle θ used in the above coordinate transformation, is shown in FIG. 26.

$$\begin{bmatrix} V\alpha \\ V\beta \end{bmatrix} = \begin{bmatrix} \cos\theta & -\sin\theta \\ \sin\theta & \cos\theta \end{bmatrix} \begin{bmatrix} v_d^{} \\ v_q^{} \end{bmatrix} \quad \text{[Expression 12]}$$

There is a relation expressed by the below Equation 13 between the target voltage vector on the d-q coordinate system and the a target voltage vector on the α-β coordinate system, and an absolute value of the target voltage vector V is held.

$$|V| = \sqrt{(v_d^{})^2 + (v_q^{})^2} = \sqrt{V\alpha^2 + V\beta^2}$$

Figure 27:
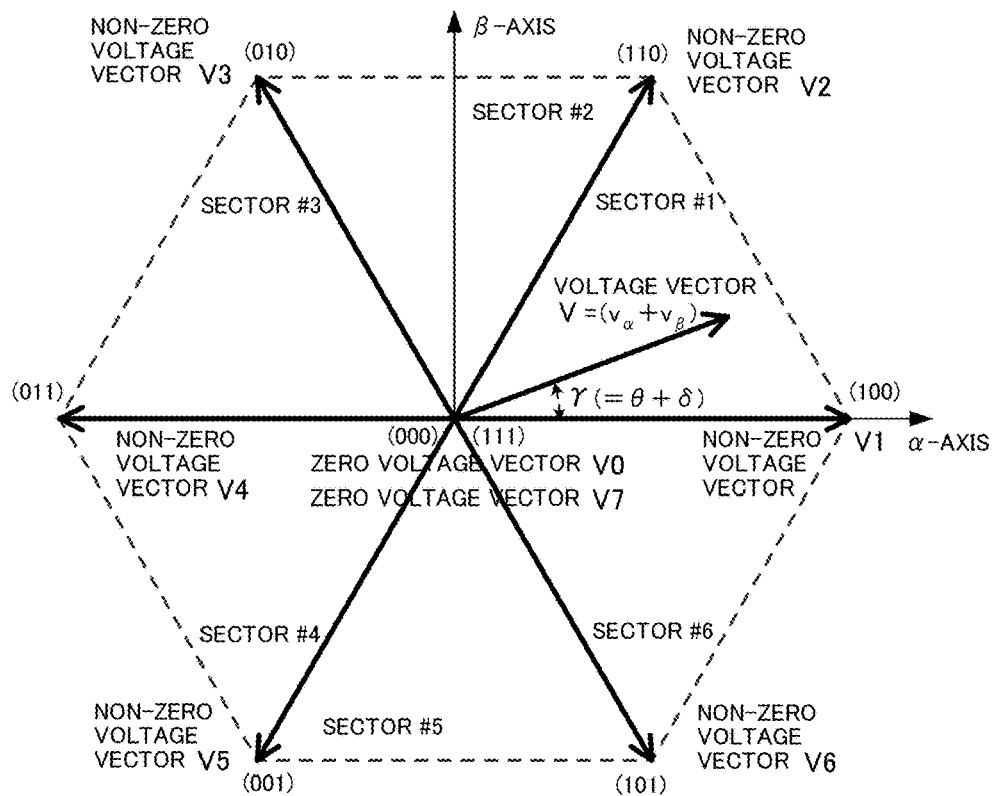
FIG. 27 is a diagram showing an operation example of the spatial vector modulating section.

In the switching patterns of the spatial vector control, the output voltages of the inverter are defined with 8-kinds discrete reference output voltage vectors V0 to V7 (non-zero voltage vectors V1 to V6 of which phases are different by π/3 [rad] and zero voltage vectors V0, V7) shown in the spatial vector diagram of FIG. 27 corresponding to the switching patterns S1 to S6 of the FETs (Q1 to Q6). The selection of the reference output voltage vectors V0 to V7 and the occurrence time thereof are controlled. It is possible to divide the spatial vectors into the six sectors #1 to #6 by using six regions sandwiched with adjacent reference output voltage vectors. The target voltage vector belongs to any one of the sectors #1 to #6, and it is possible to allot the sector number. It is possible to obtain based on the rotational angle γ in the α-β coordinate system of the target voltage vector V that the target voltage vector V being the synthetic vector of Vα and Vβ exists any one of the sectors shown in FIG. 27 sectioned to the regular hexagonal shape in the α-β space. The rotational angle γ is determined by "γ=θ+δ" as an addition of the phase δ obtained from a relation between the motor rotational angle θ and the voltage command values vd and vq in the d-q coordinate system.

Figure 28:
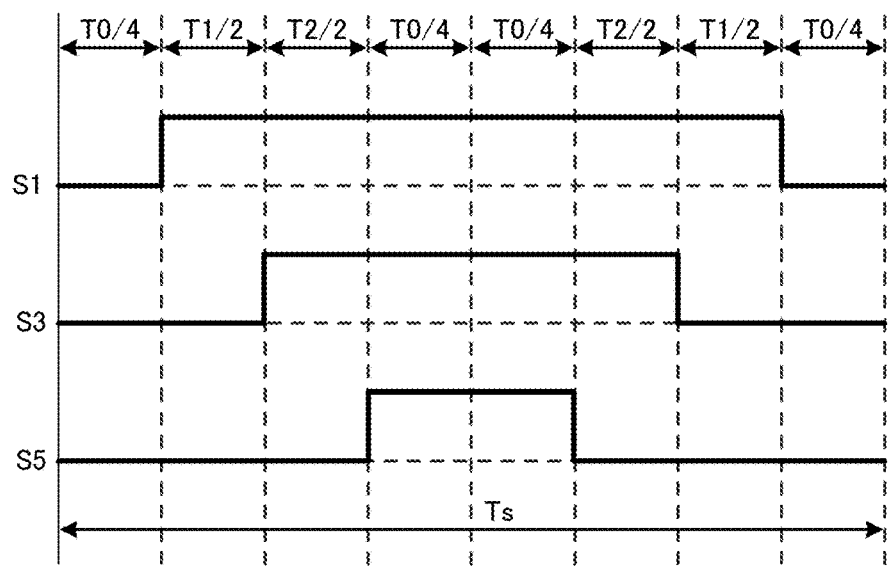
FIG. 28 is a timing chart showing an operation example of the spatial vector modulating section.

FIG. 28 shows a basic timing chart to determine, with the digital control due to the switching patterns S1, S3, S5 of the inverter in the spatial vector control, the switching pulse width and the timing in ON/OFF signals S1 to S6 (switching patterns) for the FETs in order to output the target voltage vector V from the inverter. The spatial vector modulation performs the calculation and the like at a every prescribed sampling term Ts within the sampling term Ts, and converts the calculated result into the respective switching pulse widths and the timings of the switching patterns S1 to S6 at a next sampling term Ts and then outputs.

The spatial vector modulation generates the switching patterns S1 to S6 corresponding to the sector numbers obtained based on the target voltage vector V. In FIG. 28, an example of the witching patterns S1 to S6 of the FETs of the inverter in a case of the sector number #1 (n=1) is shown. The signals S1, S3, S5 indicate gate signals of the FETs Q1, Q3, Q5 corresponding to the upper-arm. The horizontal axis is a time, and "Ts" corresponds to a switching period and is divided into 8-periods comprising T0/4, T1/2, T2/2, T0/4, T0/4, T2/2, T1/2 and T0/4. The terms T1 and T2 are respectively times depending on the sector number n and rotational angel γ.

Figure 29:
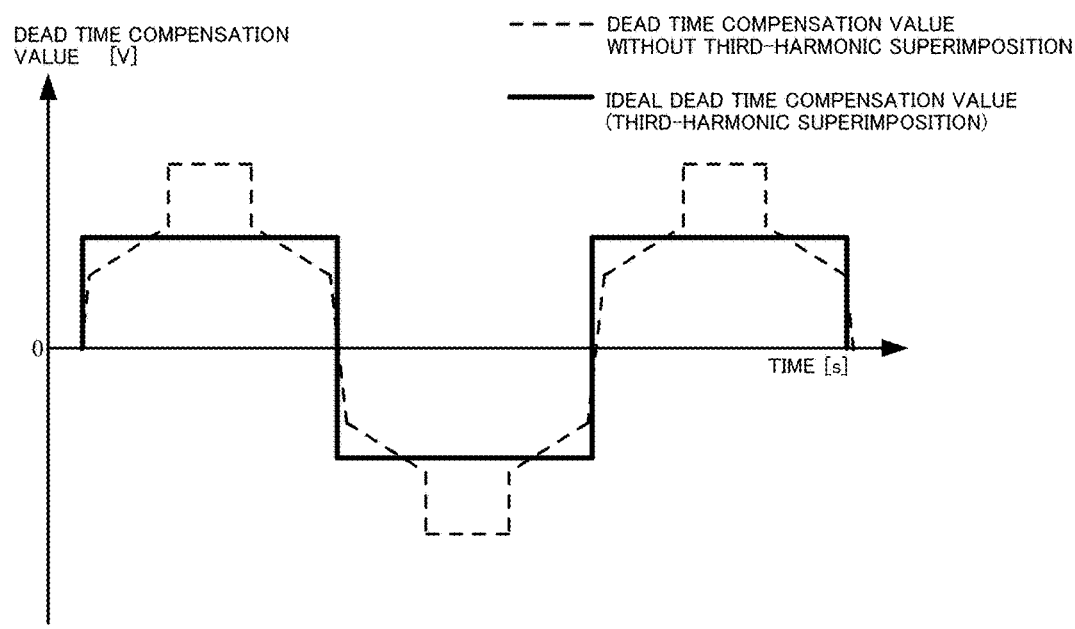
FIG. 29 is a waveform chart showing an effect of the spatial vector modulating section.

In a case that there is no the spatial vector modulation, the dead time compensation value waveform (the U-phase waveform) that dead time compensation of the present invention is applied on the dq-axes and only the dead time compensation values are dq-axes/3-phase-converted, is a waveform removed the third harmonic component as shown by a dashed-line in FIG. 29. The V-phase and the W-phase are also same. By adopting the spatial vector modulation instead of the dq-axes/3-phase conversion, it is possible to superpose the third harmonic wave to 3-phase signals and further to make up for the third harmonic component being wanting due to the 3-phase conversion. Thereby, it is possible to generate the ideal dead time compensation waveform as shown by a real line of FIG. 29.

Figure 30:
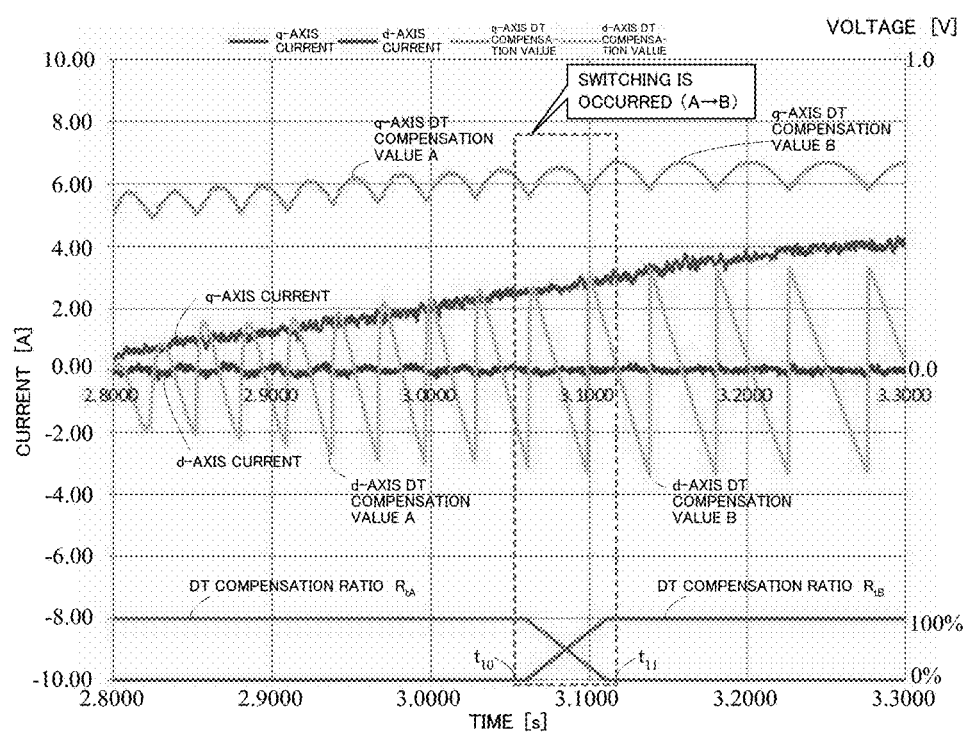
FIG. 30 is a waveform chart showing an effect of the present invention.

FIG. 30 is an experimental result by using a steering test apparatus, and indicates the waveforms of the d-axis current and the q-axis current, the d-axis dead time compensation value and the q-axis dead time compensation value when the steering is switched from the compensating function A to the compensating function B in the steering state that the steer-forward is performed from the middle speed to the high speed. As shown in FIG. 26, by adopting the dead time compensation of the present invention and switching the dead time function value from A to B, it is possible to confirm that there is no wave distortion of the dq-axes currents due to the influence of the dead time even the current control characteristic is changed at the beginning of the d-axis current flowing.

Figure 31:
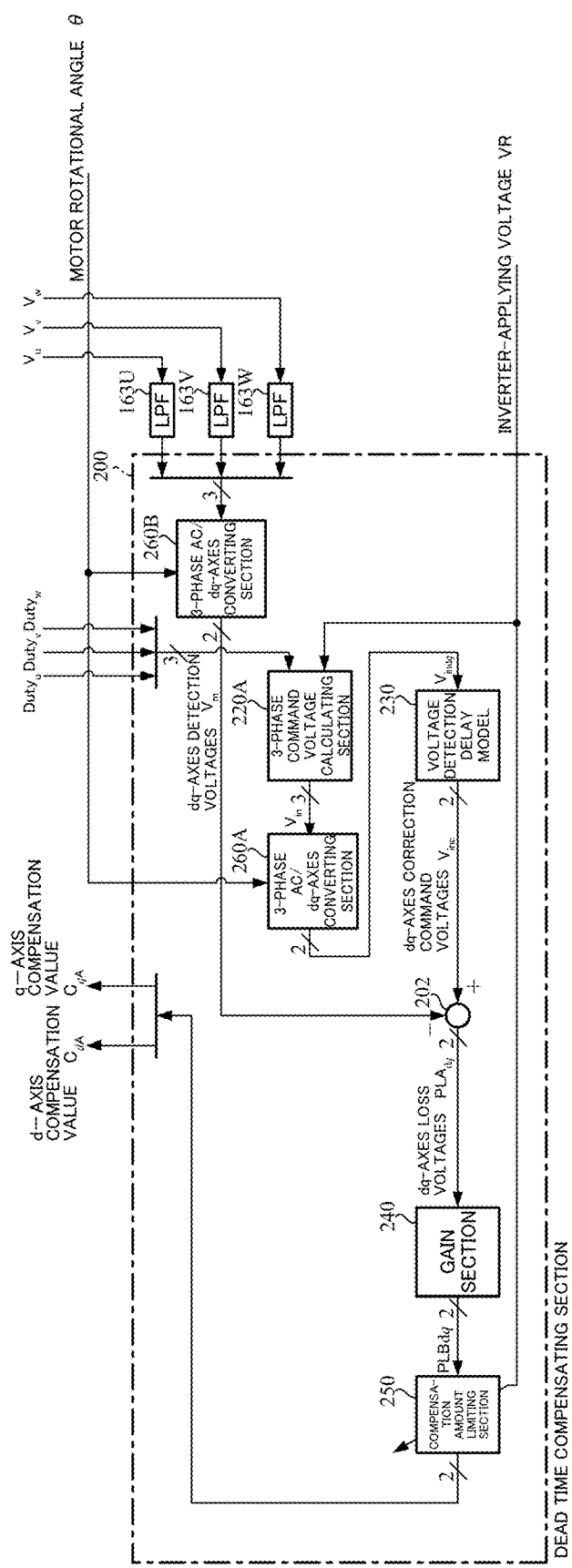
FIG. 31 is a block diagram showing an another configuration example of the dead time compensating section (A)
Figure 32:
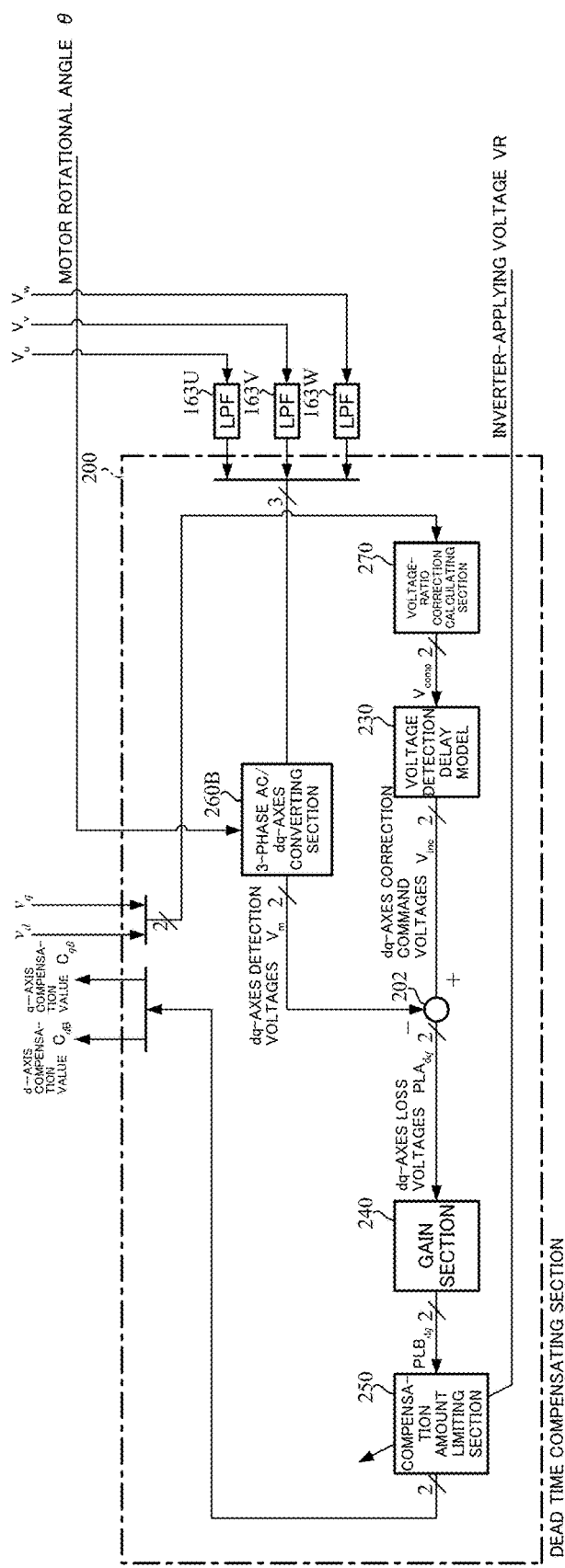
FIG. 32 is a block diagram showing an another configuration example of the dead time compensating section (A)

FIGS. 31 and 32 show another examples of the dead time compensating section (A) 200 corresponding to FIG. 7.

The example shown in FIG. 31 treats the calculation of the 3-phase loss voltages PLA as the dq-axes loss voltages PLAdq. Therefore, the 3-phase AC/dq-axes converting section 260B obtains the dq-axes detection voltages Vm from the 3-phase motor terminal voltages Vu, Vv and Vw and the motor rotational angle θ, and the dq-axes detection voltages Vm are subtraction-inputted into the subtracting section 202. Further, the 3-phase command voltage calculating section 220A obtains the 3-phase command voltage Vin from the 3-phase duty command values $Duty_u$, $Duty_v$ and $Duty_w$ in accordance with the above Expression 4, and the calculated 3-phase command voltage Vin is converted to the 2-phase command voltages Vindq in synchronization with the motor rotational angle θ at the 3-phase AC/dq-axes converting section 260A. The 2-phase command voltages Vindq is addition-inputted into the subtracting section 202 via the voltage detection delay model 230. In the present embodiment, the dq-axes compensation values CdA and CqA are outputted from the compensation amount limiting section 250.

In the example shown in FIG. 32, the terminal voltages Vu, Vv and Vw of the motor 110 are inputted into the 3-phase AC/dq-axes converting section 260B via LPFs 163U, 163V and 163W for removing the noise and are converted to the dq-axes detection voltages Vm (Vd, Vq) in synchronization with the motor rotational angle θ at the 3-phase AC/dq-axes converting section 210. The dq-axes detection voltages Vm (Vd, Vq) are subtraction-inputted into the subtracting section 202. Further, the d-axis voltage command value vd and the q-axis voltage command value vq are inputted into the voltage-ratio correction calculating section 270, and the voltage-ratio correction calculating section 270 calculates, by assuming that the PWM-period is PWM_Time and "DT" is the dead time, the dq-axes correction command voltages Vcomp (Vcomp_d, Vcomp_q) by using the below Expression 14. The dq-axes correction command voltages Vcomp (Vcomp_d, Vcomp_q) are inputted into the voltage detection model 230.

$$V_{comp\_d} = \frac{\text{PWM\_Time}}{\text{PWM\_Time} + 2 \times DT} \times v_d \quad \text{[Expression 14]}$$

$$V_{comp\_q} = \frac{\text{PWM\_Time}}{\text{PWM\_Time} + 2 \times DT} \times v_q$$

The dq-axes correction command voltages Vinc from the voltage detection delay model 230 are addition-inputted into the subtracting section 202. Also, the dq-axes compensation values CdA and CqA are outputted from the compensation amount limiting section 250 in the present embodiment.

Figure 33:
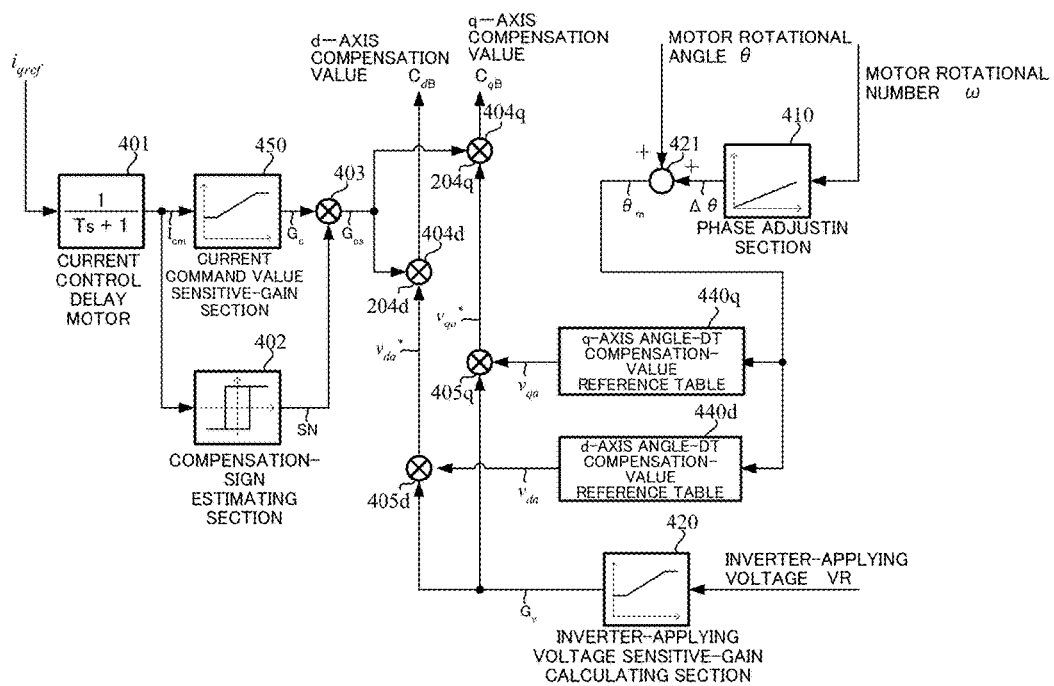
FIG. 33 is a block diagram showing an another configuration example of the dead time compensating section (B).

FIG. 33 shows another embodiment of the dead time compensating section (B) 400 corresponding to FIG. 12, and the dq-axes compensation values CdB and CqB are directly calculated in the dq-axes angle—dead time compensation-value reference tables 440d and 440q in the present embodiment. The dq-axes angle—dead time compensation-value reference tables 440d and 440q calculate, on the off-line, the dead time compensation values being function of the angle to be needed for the three phases and convert to compensation values on the dq-axes. The output voltages Vda and vqa indicating the dead time reference compensation values from the dq-axes angle—dead time compensation-value reference tables 440d and 440q are respectively inputted into the multiplying sections 405d and 405q and are multiplied with the voltage sensitive-gain Gv. The dq-axes compensation values vda* and vqa* multiplied with the voltage sensitive-gain Gv are respectively inputted into the multiplying sections 404d and 404q and are multiplied with the current command value sensitive-gain Gcs. The multiplied results at the multiplying sections 404d and 404q are the dq-axes compensation values CdB and CqB.

EXPLANATION OF REFERENCE NUMERALS

1 handle (steering wheel)
2 column shaft (steering shaft, handle shaft)
20, 100, motor
30 control unit (ECU)
31 steering-assist command value calculating section
35, 120d, 120q PI-control section
36, 160 PWM-control section
37, 161 inverter
110 angle detecting section
130, 260, 440 3-phase alternative current (AC)/dq-axes converting section
140 d-q non-interference control section
160A duty command value calculating section
160B PWM-control circuit
200 dead time compensating section (A)
210 midpoint voltage estimating section
220, 220A 3-phase command voltage calculating section
210, 430 phase adjusting section
230 voltage detection delay model
240 gain section
250 compensation amount limiting section
270 voltage-ratio correction calculating section
300 spatial vector modulating section
301 2-phase/3-phase converting section
302 third-harmonic superimposition section
400 dead time compensating section (B)
401 current control delay model
402 compensation-sign estimating section
410 phase adjusting section
420 inverter-applying voltage sensitive-gain calculating section
421 input limiting section
450 current command value sensitive-gain section
500 compensation-value switching section
510 compensation-value switch judging section
520 mixing-ratio calculating section
530 mixing section

The invention claimed is:

1. An electric power steering apparatus of a vector control system that calculates steering assist command values of dq-axes based on at least a steering torque, calculates dq-axes current command values from said steering assist command values, converts said dq-axes current command values into 3-phase duty command values, driving-controls a 3-phase brushless motor by an inverter of a pulse width modulation (PWM) control, and applies an assist torque to a steering system of a vehicle, wherein said electric power steering apparatus has two dead time compensating functions A and B of which efficiencies to perform a dead time compensation of said inverter are different, wherein said dead time compensating function A is a compensation function based on motor terminal voltages and has an effect in a low speed steering maneuver, and said dead time compensating function B is a compensation function based on a motor rotational angle and has an effect in a low speed steering maneuver and a middle speed steering maneuver, and wherein said dead time compensation is performed by gradually switching from one of said dead time compensating functions A and B to other dead time compensating function while mixing said dead time compensating functions A and B.

2. The electric power steering apparatus according to claim 1, wherein a ratio of mixing operation is linearly or nonlinearly changing based on a steering assist command value of a d-axis.

3. An electric power steering apparatus of a vector control system that calculates steering assist command values of dq-axes based on at least a steering torque, calculates dq-axes current command values from said steering assist command values, converts said dq-axes current command values into 3-phase duty command values, driving-controls a 3-phase brushless motor by an inverter of a pulse width modulation (PWM) control, and applies an assist torque to a steering system of a vehicle, comprising:

a dead time compensating section A that calculates first dq-axes compensation values relating to said dq-axes of said inverter based on 3-phase terminal voltages of said 3-phase brushless motor;

a dead time compensating section B that calculates second dq-axes compensation values relating to said dq-axes of said inverter based on a motor rotational angle; and a compensation-value switching section that gradually and mutually switches while mixing said first dq-axes compensation values and said second dq-axes compensation values based on said steering assist command value of said q-axis, and outputs dq-axes dead time compensation values, wherein a dead time compensation of said inverter is performed by a correction of said dq-axes current command values with said dq-axes dead time compensation values.

4. The electric power steering apparatus according to claim 3, wherein said compensation-value switching section comprising:

a switch judging section to judge a compensation-value switch based on said steering assist command value of said q-axis;

a mixing-ratio calculating section to calculate a mixing-ratio $R_{tA}$ (%) of said first dq-axes compensation values and a mixing-ratio $R_{tB}$ (%) of said second dq-axes compensation values due to a compensation-value switch judgment flag from said switch judging section; and a mixing section to input said first dq-axes compensation values and said second dq-axes compensation values, and to calculate said dq-axes dead time compensation values based on said mixing-ratio $R_{tA}$ (%) and said mixing-ratio $R_{tB}$ (%).

5. The electric power steering apparatus according to claim 4, wherein said mixing section comprising:

a switch which inputs a count-up value and a count-down value and is switched due to said compensation-value switch judgment flag;

a count-value limiting section to limit, via an adding section, said count-up value or said count-down value from said switch and output said mixing-ratio $R_{tB}$ (%);

a holding unit which holds said mixing-ratio $R_{tB}$ (%) and adds to said adding section; and a subtracting section to output said mixing-ratio $R_{tA}$ (%) by subtracting said mixing-ratio $R_{tB}$ (%) from a value of 100%.

6. The electric power steering apparatus according to claim 5, wherein said count-up value and said count-down value are changeable.

7. The electric power steering apparatus according to claim 5, wherein said mixing section comprising:

a first multiplying section which multiplies said first dq-axes compensation values with said mixing-ratio $R_{tA}$ (%);

a second multiplying section which multiplies said second dq-axes compensation values with said mixing-ratio $R_{tB}$ (%); and an adding section to output said dq-axes dead time compensation values by adding a multiplied result of said first multiplying section and a multiplied result of said second multiplying section.

8. The electric power steering apparatus according to claim 5, wherein said mixing-ratio $R_{tA}$(%) and said mixing-ratio $R_{tB}$ (%) non-linearly vary and have a relation being $R_{tA}$ (%)+$R_{tB}$ (%)=100%.

9. The electric power steering apparatus according to claim 5, wherein said correction is performed by an adding calculation of said dq-axes dead time compensation values and said dq-axes current command values.

10. The electric power steering apparatus according to claim 4, wherein said mixing section comprising:

a first multiplying section which multiplies said first dq-axes compensation values with said mixing-ratio $R_{tA}$ (%);

a second multiplying section which multiplies said second dq-axes compensation values with said mixing-ratio $R_{tB}$ (%); and an adding section to output said dq-axes dead time compensation values by adding a multiplied result of said first multiplying section and a multiplied result of said second multiplying section.

11. The electric power steering apparatus according to claim 4, wherein said mixing-ratio $R_{tA}$ (%) and said mixing-ratio $R_{tB}$ (%) non-linearly vary and have a relation being $R_{tA}$ (%)+$R_{tB}$ (%)=100%.

12. The electric power steering apparatus according to claim 4, wherein said correction is performed by an adding calculation of said dq-axes dead time compensation values and said dq-axes current command values.

* * * * *